(12) United States Patent
Koo et al.

(10) Patent No.: US 11,368,691 B2
(45) Date of Patent: *Jun. 21, 2022

(54) METHOD AND DEVICE FOR DESIGNING LOW-COMPLEXITY CALCULATION DST7

(71) Applicant: LG ELECTRONICS INC., Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/043,494

(22) PCT Filed: Mar. 29, 2019

(86) PCT No.: PCT/KR2019/003742
§ 371 (c)(1),
(2) Date: Sep. 29, 2020

(87) PCT Pub. No.: WO2019/190283
PCT Pub. Date: Oct. 3, 2019

(65) Prior Publication Data
US 2021/0029357 A1 Jan. 28, 2021

Related U.S. Application Data

(60) Provisional application No. 62/651,240, filed on Apr. 1, 2018.

(30) Foreign Application Priority Data

Mar. 29, 2018 (KR) .................. 10-2018-0036810
Apr. 10, 2018 (KR) .................. 10-2018-0041604

(51) Int. Cl.
*H04N 19/122* (2014.01)
*H04N 19/14* (2014.01)
(Continued)

(52) U.S. Cl.
CPC .......... *H04N 19/122* (2014.11); *H04N 19/14* (2014.11); *H04N 19/176* (2014.11);
(Continued)

(58) Field of Classification Search
CPC .... H04N 19/122; H04N 19/14; H04N 19/176; H04N 19/625; H04N 19/12; H04N 19/147; H04N 19/70; H04N 19/439; G06F 17/147
See application file for complete search history.

(56) References Cited

U.S. PATENT DOCUMENTS

2018/0020218 A1* 1/2018 Zhao ................. H04N 19/103
2018/0332289 A1* 11/2018 Huang ............... H04N 19/139
(Continued)

FOREIGN PATENT DOCUMENTS

| KR | 101529650 | 6/2015 |
| KR | 20170107452 | 9/2017 |
| WO | WO2018/013953 | 1/2018 |

OTHER PUBLICATIONS

Chivukula et al "Fast computing of discrete cosine and sine transforms of types VI and VII," SPIE Optical Engineering+ Applications, 2011.*

(Continued)

*Primary Examiner* — Frank F Huang
(74) *Attorney, Agent, or Firm* — Fish & Richardson P.C.

(57) ABSTRACT

Reconstructing a video signal based on low-complexity DST7 design including obtaining a transform index of a current block from the video signal and deriving a transform combination corresponding to the transform index. The
(Continued)

transform index corresponds to any one of a plurality of transform combinations including a combination of DST7 and/or DCT8, and the transform combination includes horizontal and vertical transforms that correspond to at least one of the DST7 or the DCT8. The reconstruction also includes performing an inverse transform in a vertical direction by using the DST7, performing an inverse transform in a horizontal direction by using the DCT8, and reconstructing the video signal by using the current block on which the inverse transform is performed. The DST7 includes Discrete Fourier Transform (DFT) and has a different type of DFT structure based on a size of the current block.

5 Claims, 23 Drawing Sheets

(51) Int. Cl.
| | |
|---|---|
| *H04N 19/176* | (2014.01) |
| *H04N 19/625* | (2014.01) |
| *H04N 19/105* | (2014.01) |
| *H04N 19/513* | (2014.01) |
| *H04N 19/51* | (2014.01) |
| *H04N 19/103* | (2014.01) |
| *H04N 19/70* | (2014.01) |
| *H04N 19/423* | (2014.01) |
| *H04N 19/55* | (2014.01) |

(52) U.S. Cl.
CPC ......... *H04N 19/625* (2014.11); *H04N 19/103* (2014.11); *H04N 19/105* (2014.11); *H04N 19/423* (2014.11); *H04N 19/51* (2014.11); *H04N 19/513* (2014.11); *H04N 19/55* (2014.11); *H04N 19/70* (2014.11)

(56) References Cited

U.S. PATENT DOCUMENTS

| | | | |
|---|---|---|---|
| 2020/0177901 A1* | 6/2020 | Choi | H04N 19/122 |
| 2020/0236400 A1* | 7/2020 | Kanoh | H04N 19/52 |
| 2021/0144376 A1* | 5/2021 | Tsukuba | H04N 19/139 |

OTHER PUBLICATIONS

Chen et al., "Algorithm Description of Joint Exploration Test Model 7 (JEM 7)", JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017, 48 pages.

Chivukula et al., "Fast Computing of Discrete Cosine and Sine Transforms of Types VI and VII", Proc. of SPIE, 2011, 8135:1-10.

PCT International Search Report in International Application No. PCT/KR2019/003742, dated Jul. 24, 2019, 5 pages (with English translation).

* cited by examiner

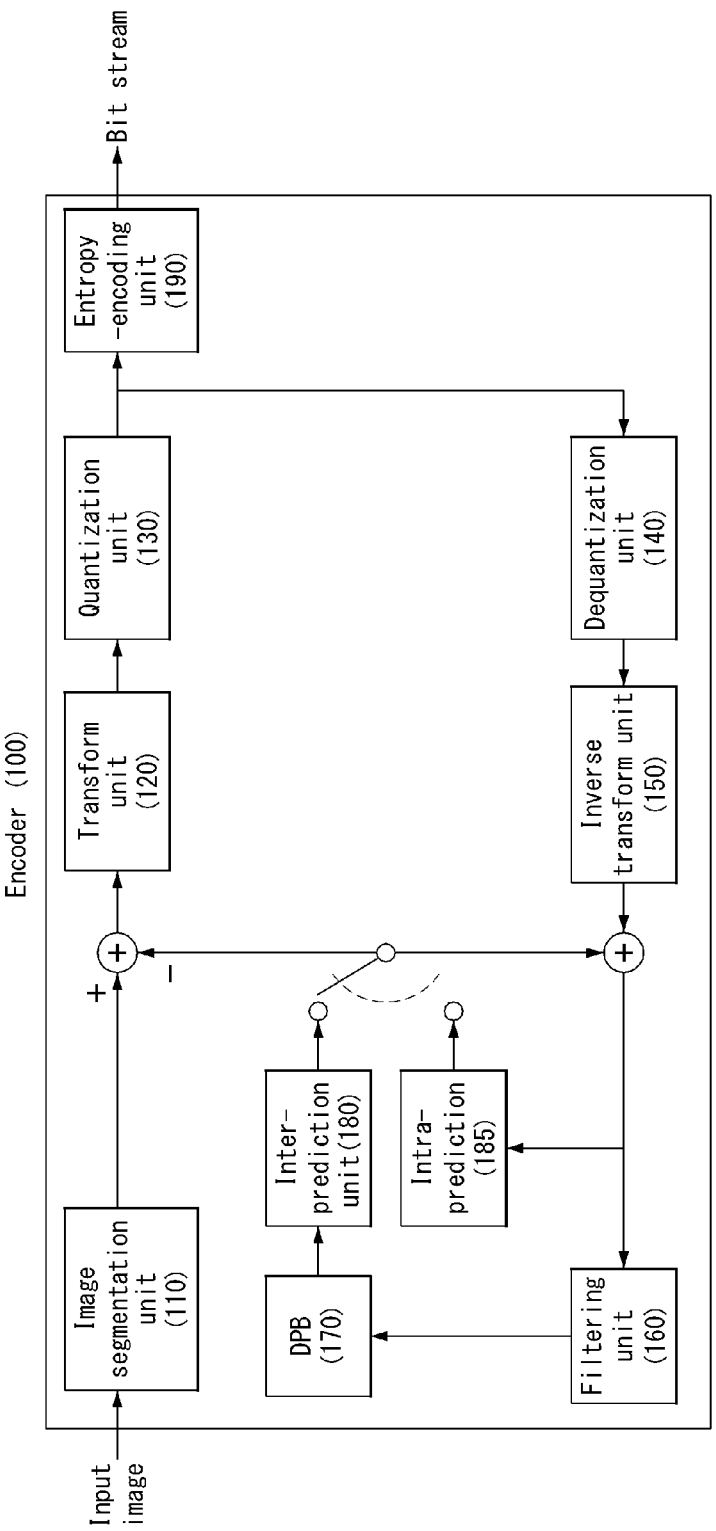
[FIG. 1]

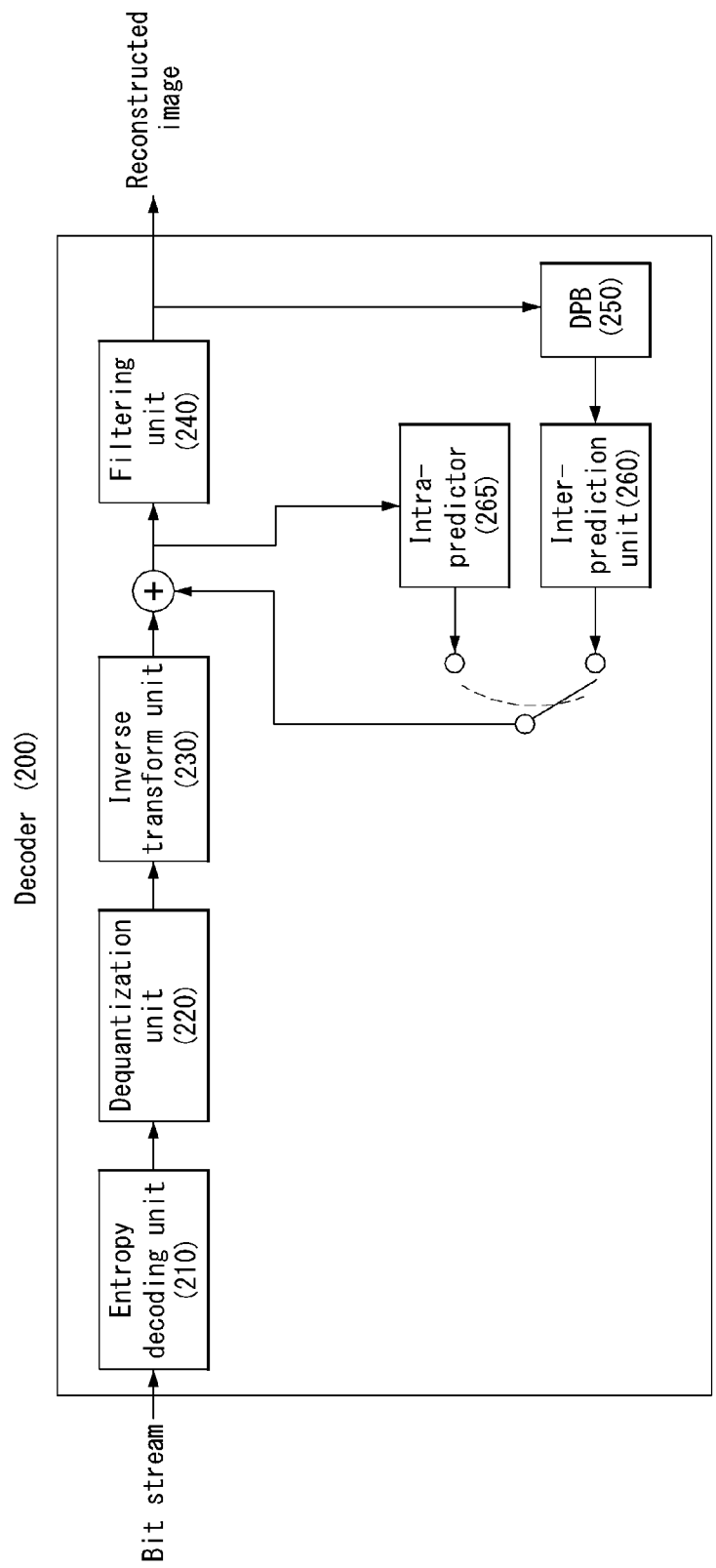
[FIG. 2]

[FIG. 3A]
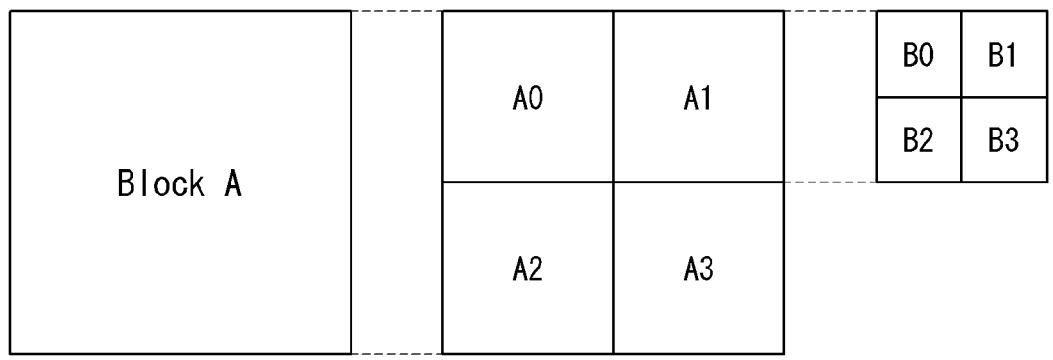
[FIG.3B]
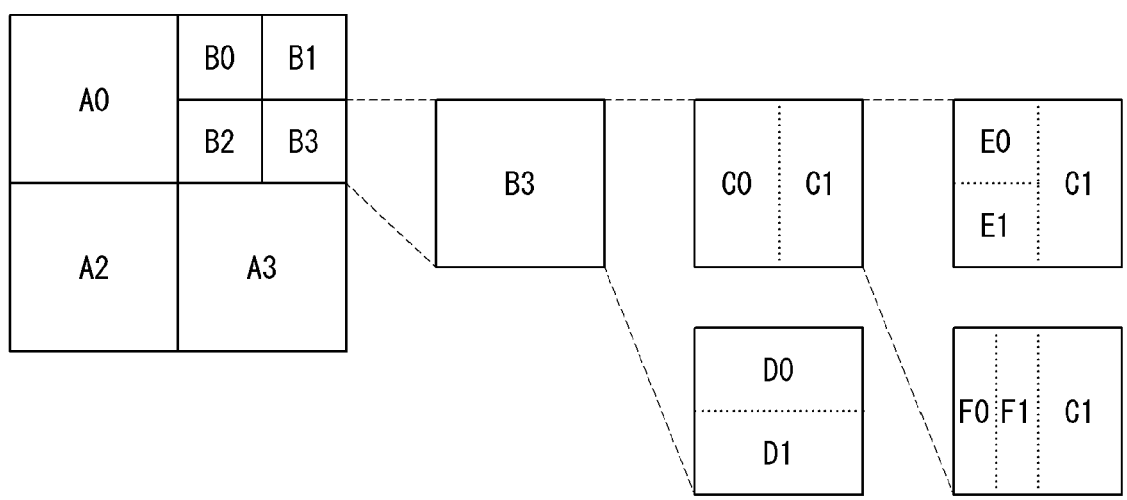

[FIG. 3C]
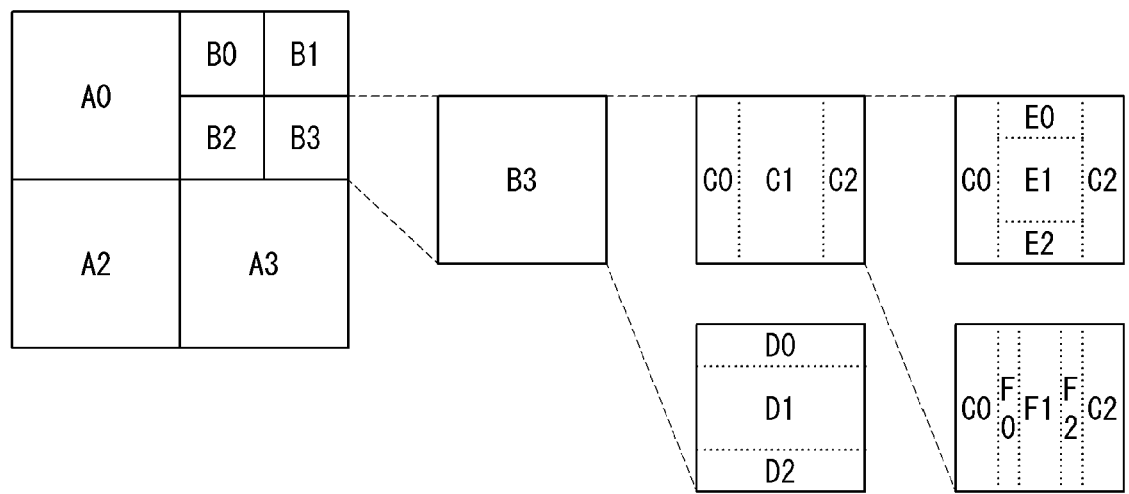
[FIG. 3D]
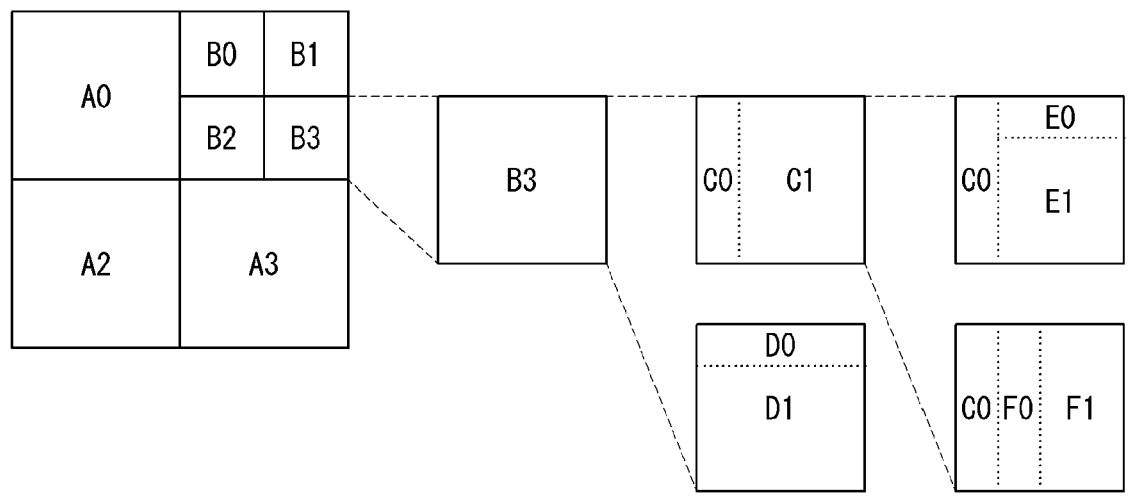

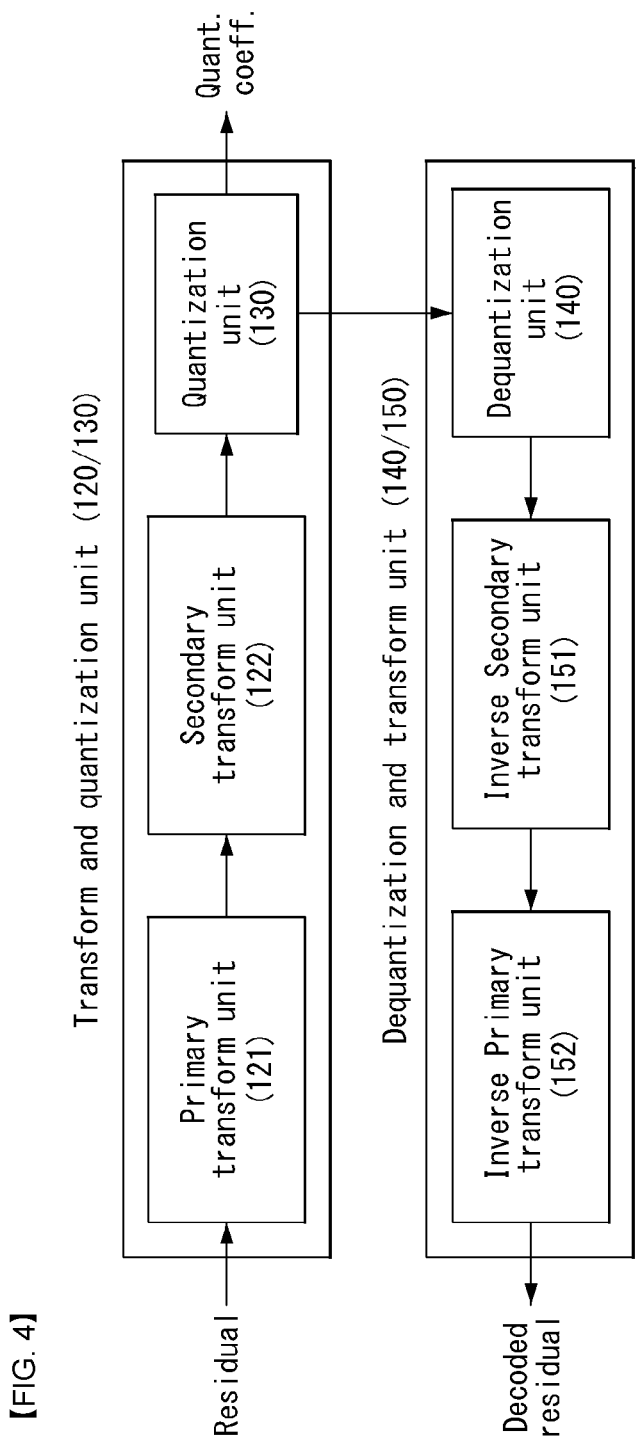
[FIG. 4]

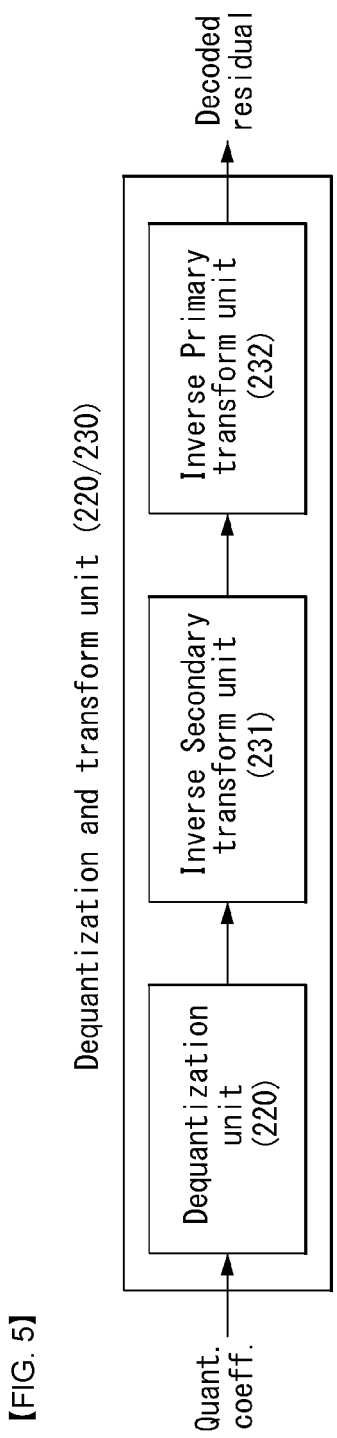
[FIG. 5]

[FIG. 6]

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT5 | | |
| | 3 | DCT5 | DCT5 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

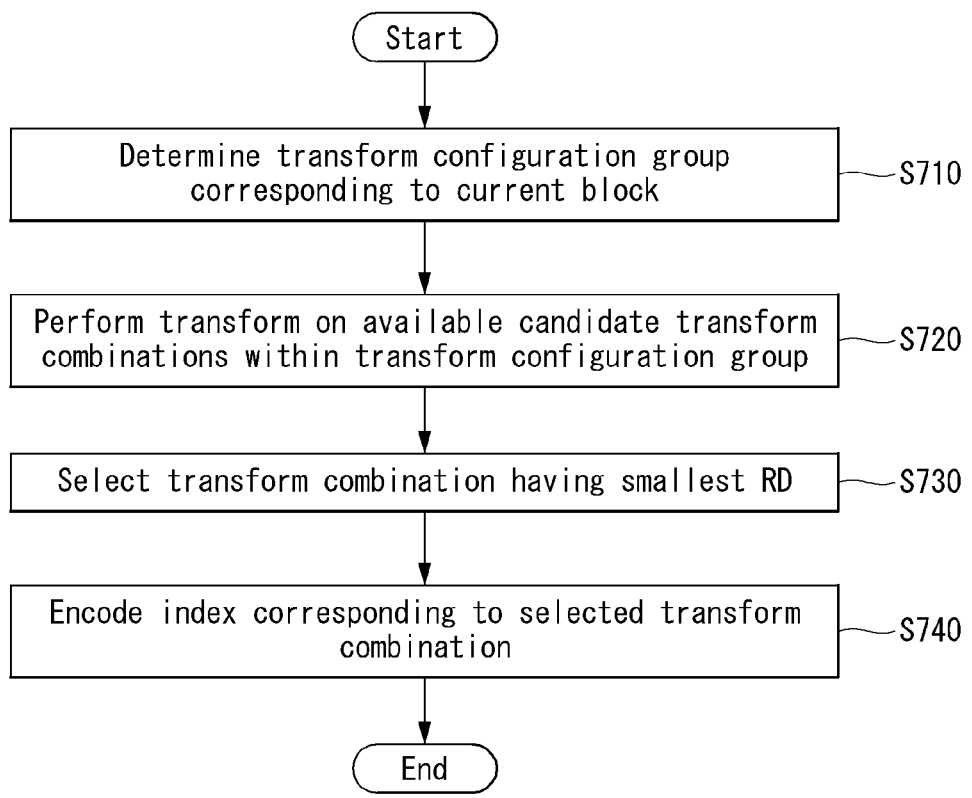
[FIG. 7]

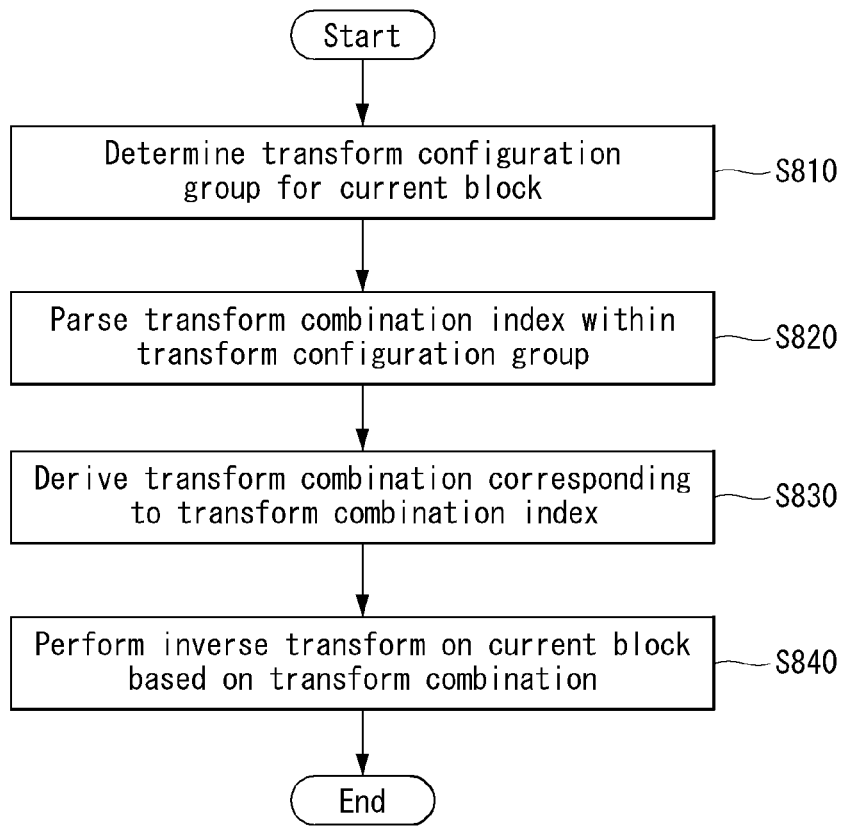
[FIG. 8]

[FIG. 9]
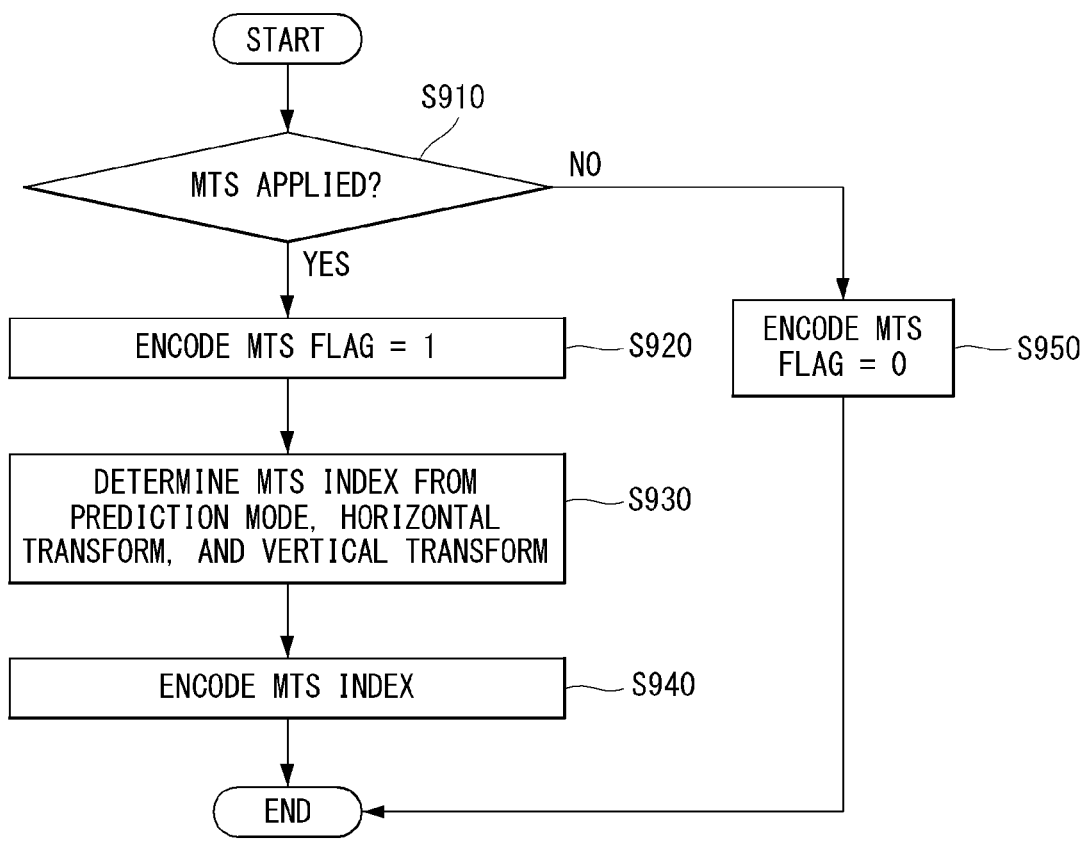

[FIG. 10]
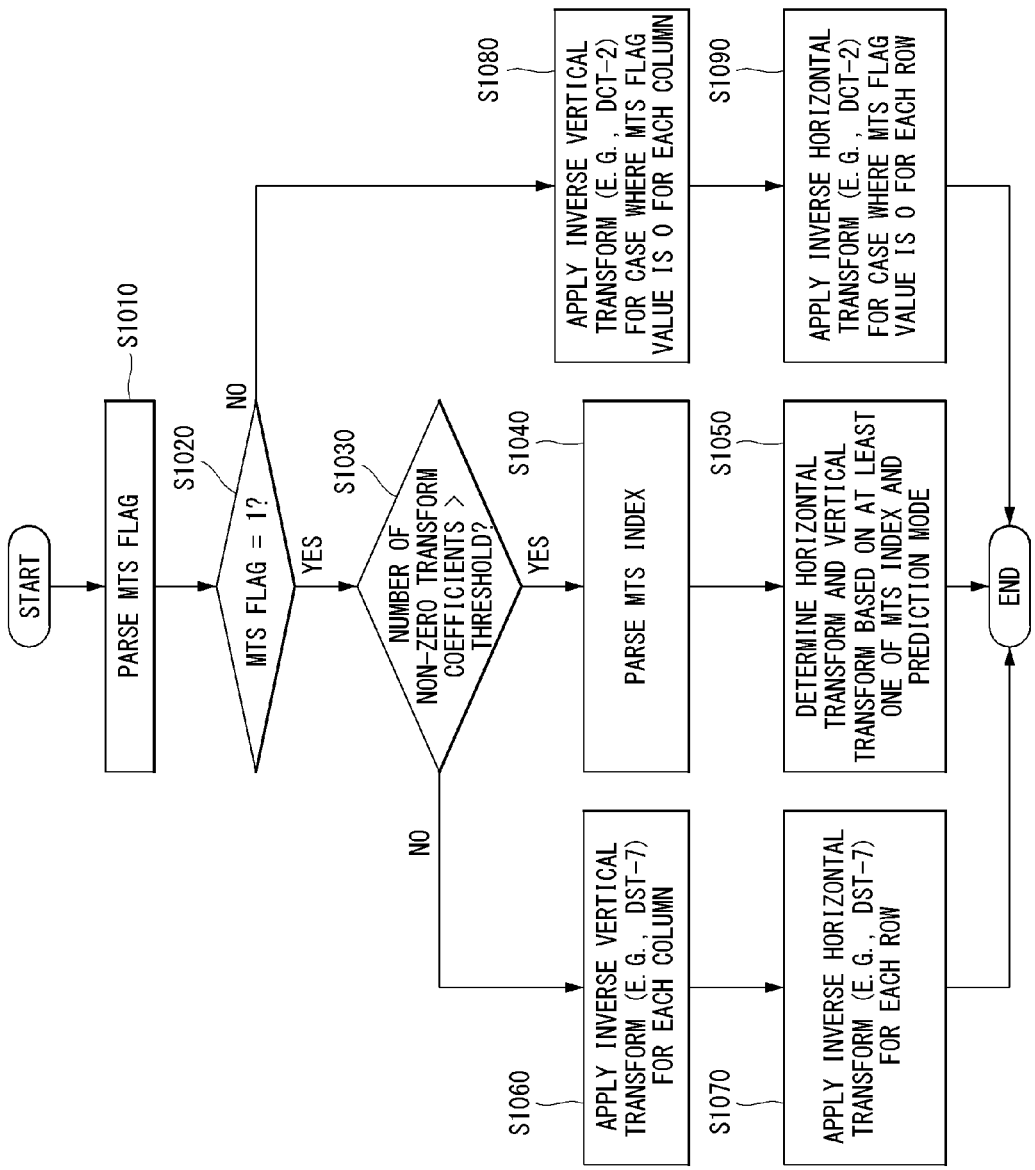

[FIG. 11]
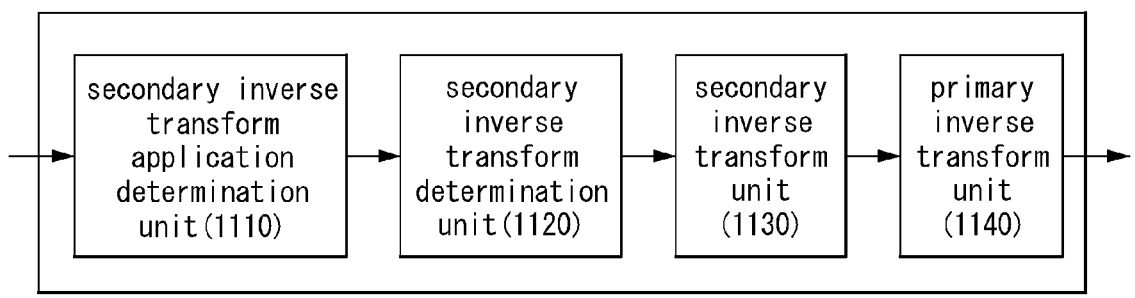

[FIG. 12]
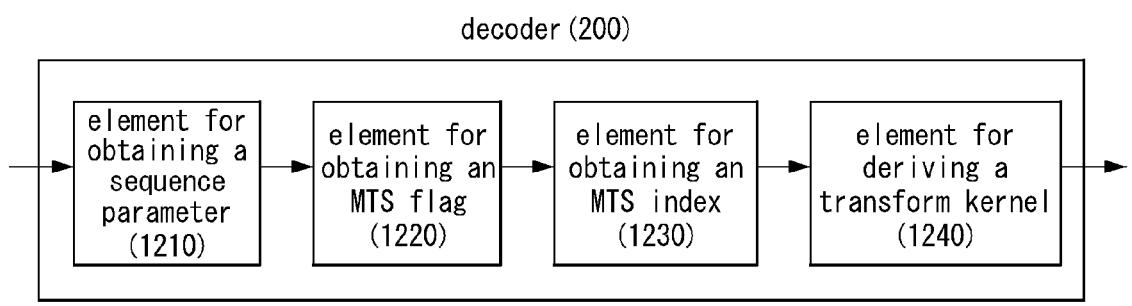

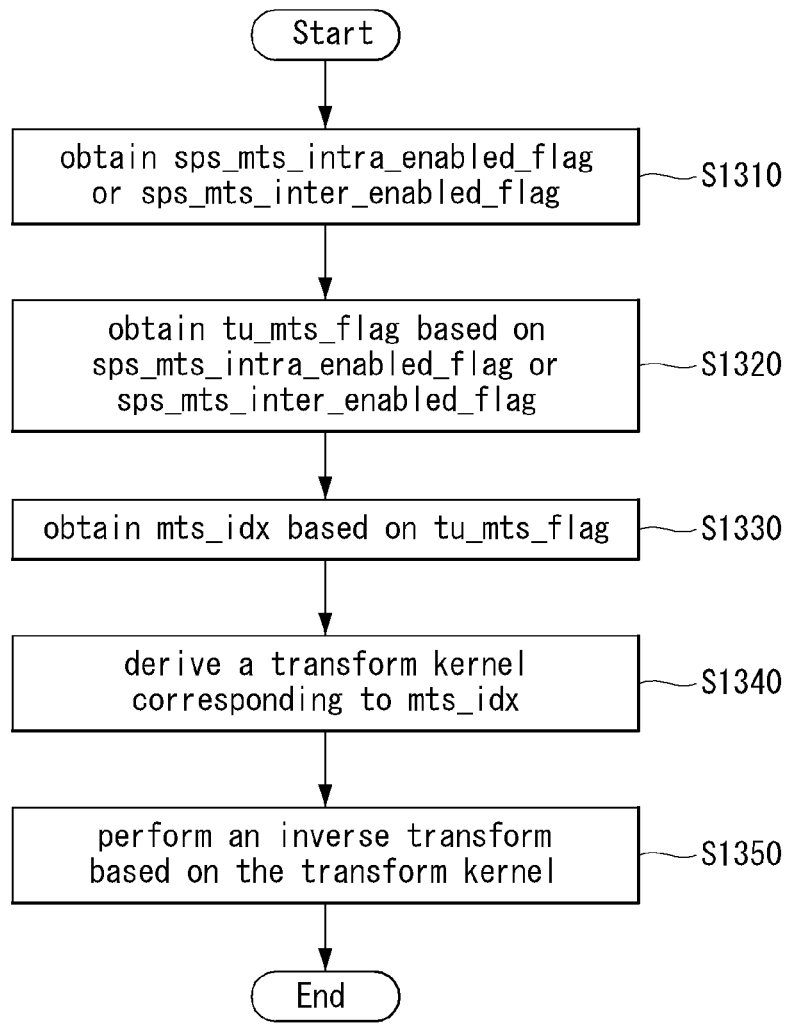

[FIG. 14]
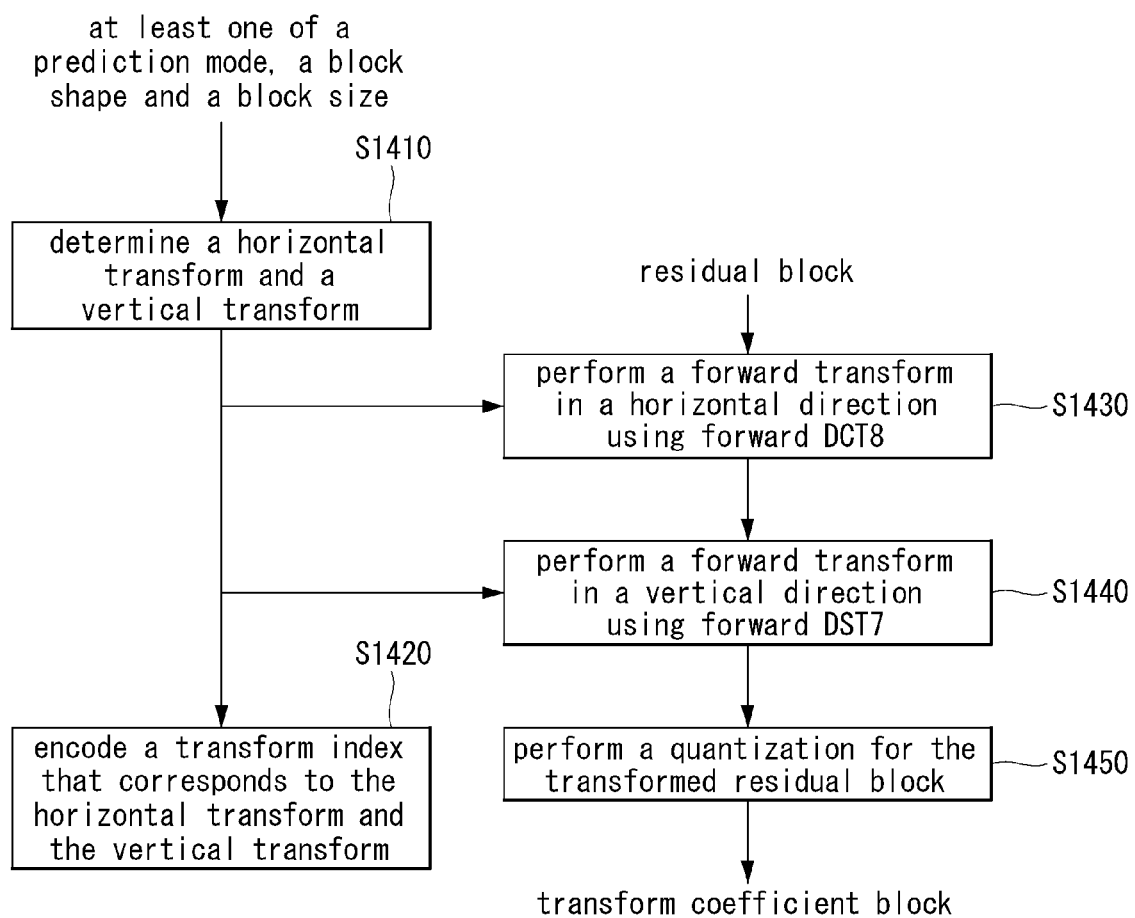

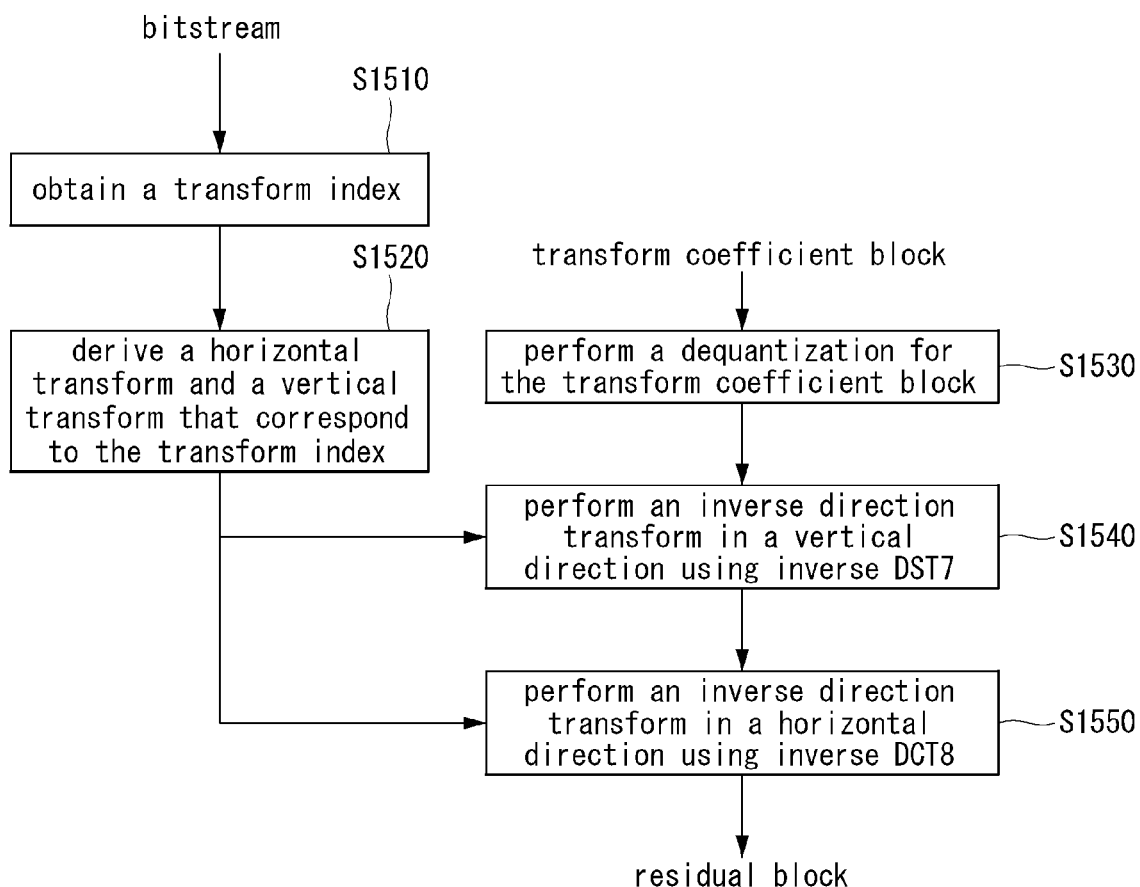

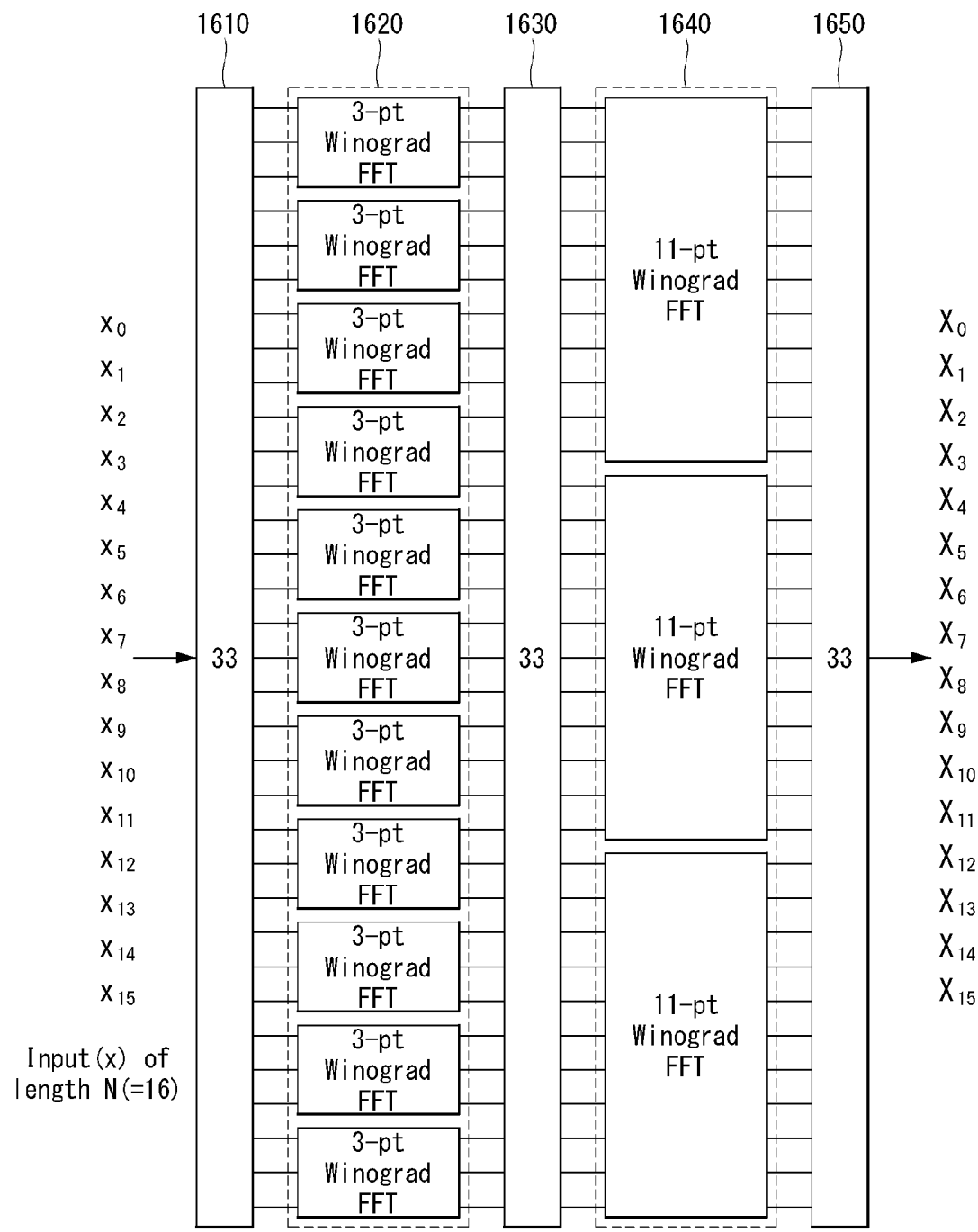
[FIG. 16]

[FIG. 17]
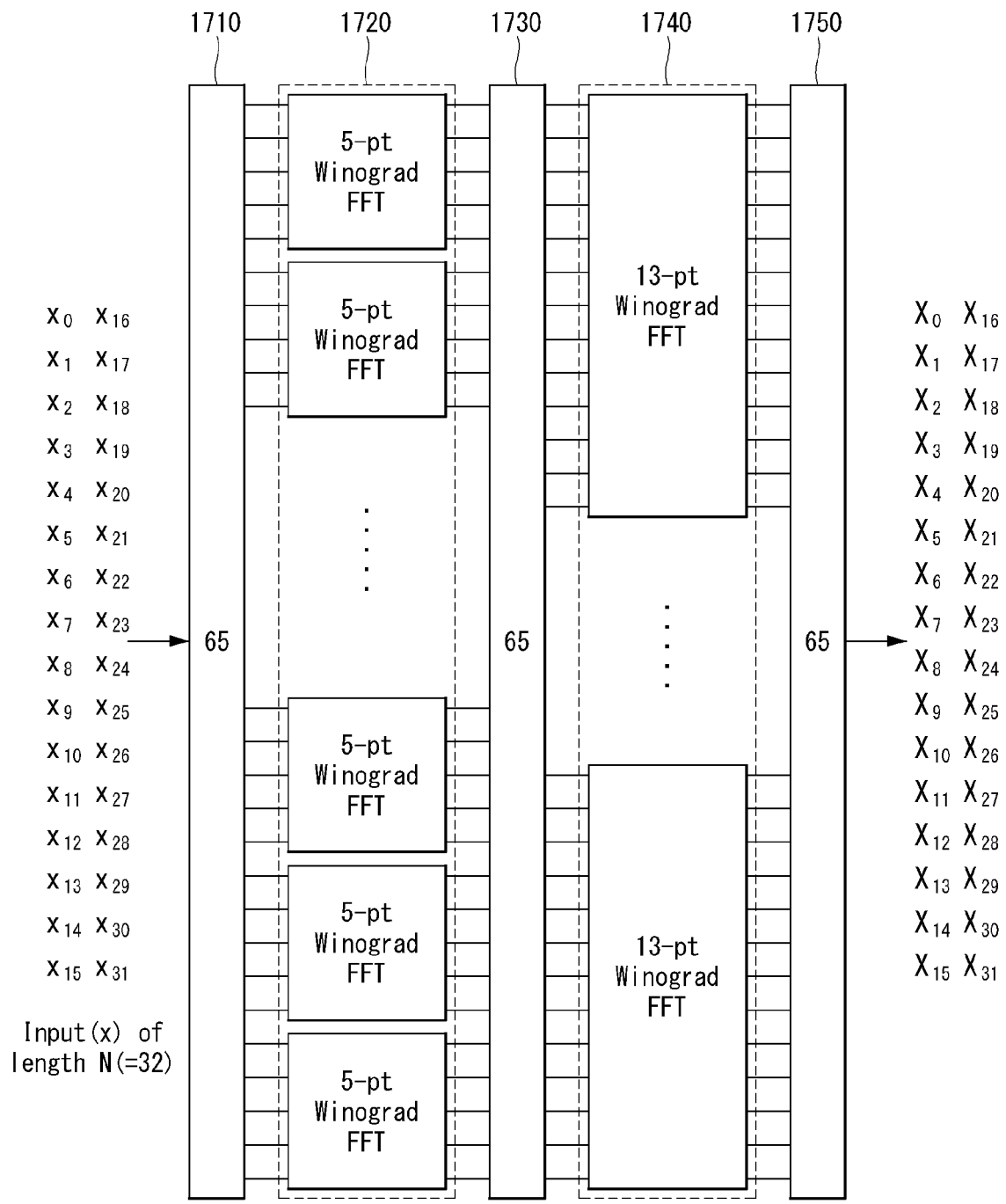

[FIG. 18]
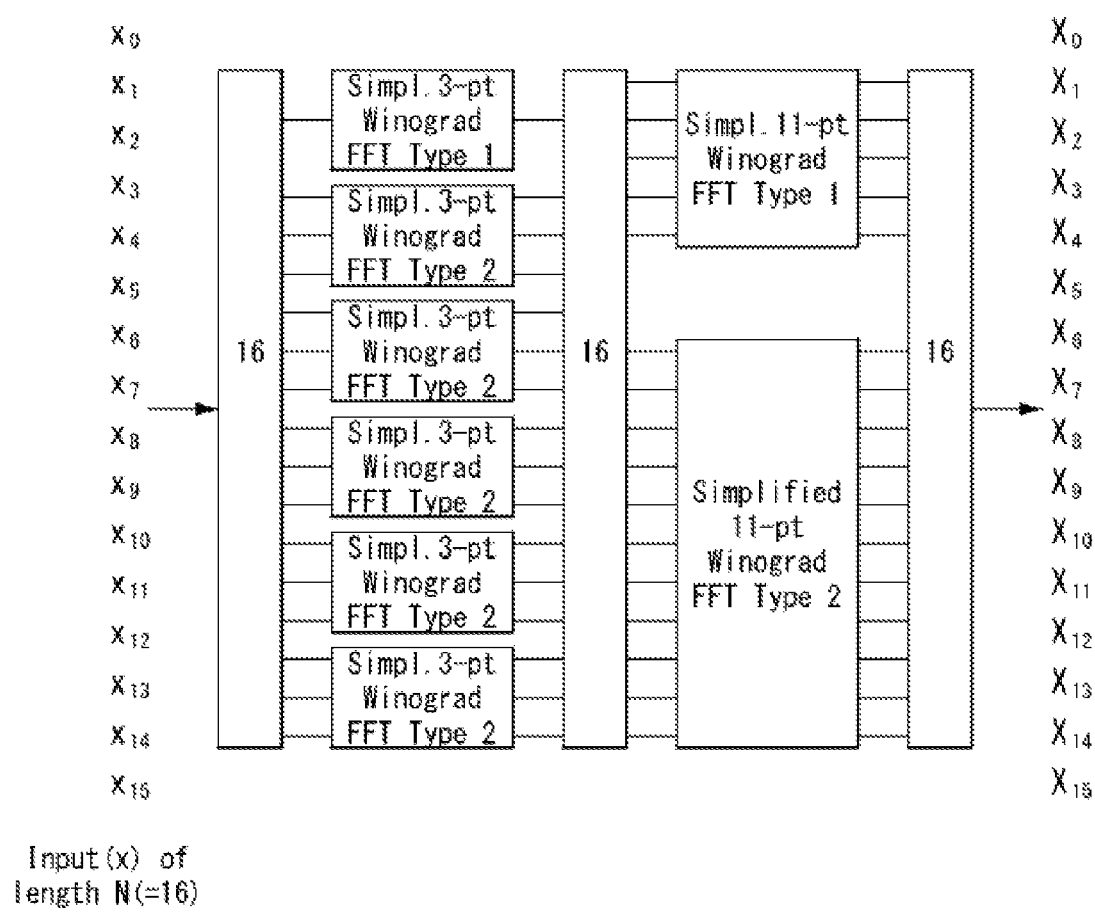

[FIG. 19]
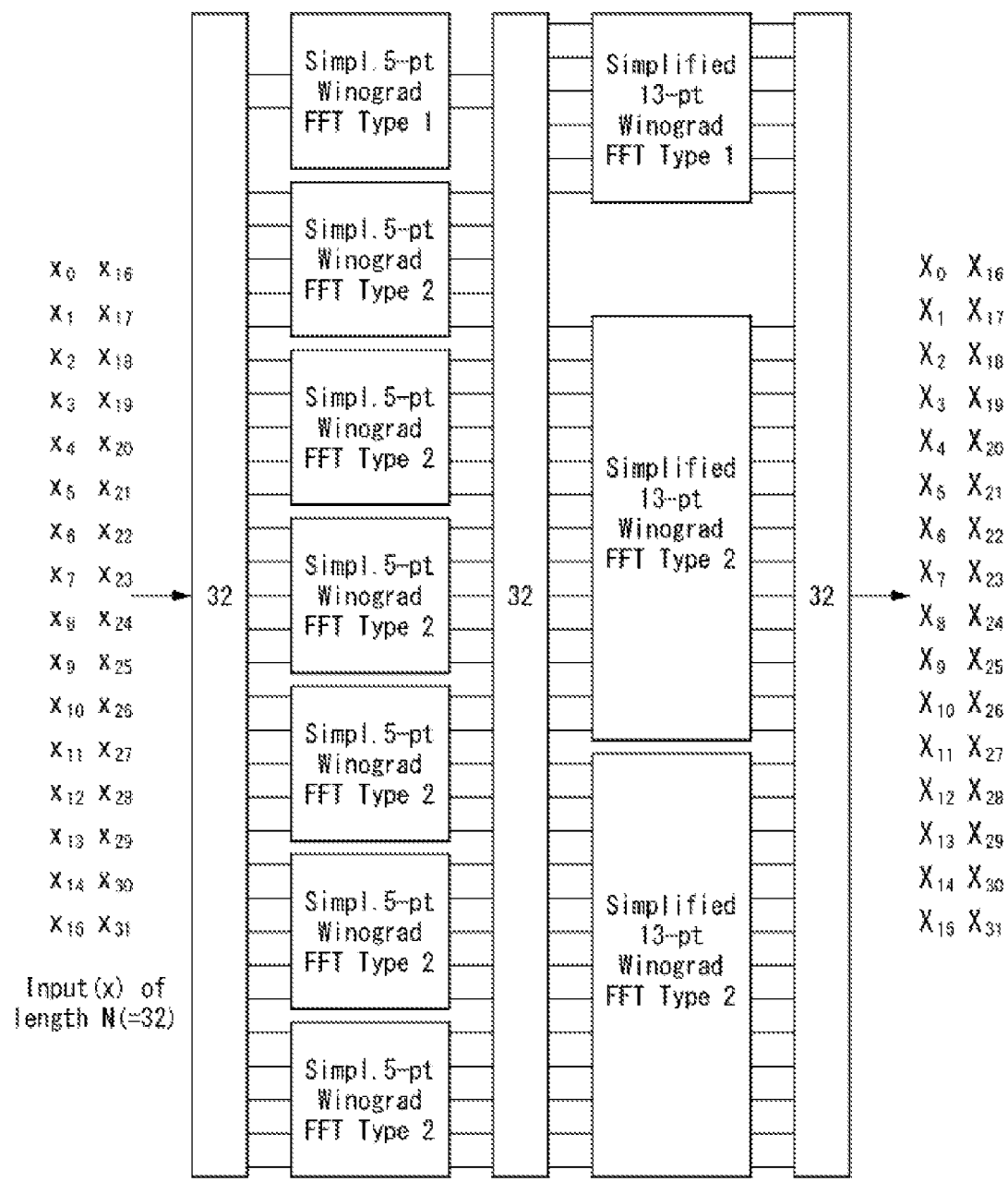

[FIG. 20]

| FFT length | Coefficients | Scale factor (S) | Formula |
|---|---|---|---|
| 3 | -1774, -3072 | $2^{11}$ | $\text{round}(c \times S)$ |
| 5 | 1948, -3152, -744, 1145, -2560 | $2^{11}$ | $\text{round}(c \times S)$ |
| 11 | 392, 118, 184, 336, 504, 306, 15, 138, 183, 382, 198, 443, 75, 133, 18, 235, 226, 386, 291, 151, 357 | $2^{11}$ | $\text{round}((1/\sqrt{2 \times 16 + 1}) \times c \times S)$ |
| 13 | 389, 108, 269, 144, 207, 188, 186, 3, 154, 55, 208, 415, 326, 294, 430, 309, 398, 15, 16, 104, 359 | $2^{11}$ | $\text{round}\left((1/\sqrt{2 \times 32 + 1}) \times 2^{\frac{1}{2}} \times c \times S\right)$ |
| 17 | -1266, -608, 937, -848, -519, 684, 335, -2188, 927, -201, 336, -67, -3258, 1109, 5407, -1827, 5734, -2080, -19, -522, 270 | $2^{11}$ | $\text{round}\left((1/\sqrt{2 \times 8 + 1}) \times 2 \times 2^{\frac{1}{2}} \times c \times S\right)$ |

[FIG. 21]

| Size | Our implementation | | Matrix computation | |
|---|---|---|---|---|
| | # of mult. | # of add./sub. | # of mult. | # of add./sub. |
| 8×8 | 21 | 77 | 64 | 56 |
| 16×16 | 42 | 125 | 256 | 240 |
| 32×32 | 87 | 279 | 1024 | 992 |

[FIG. 22]
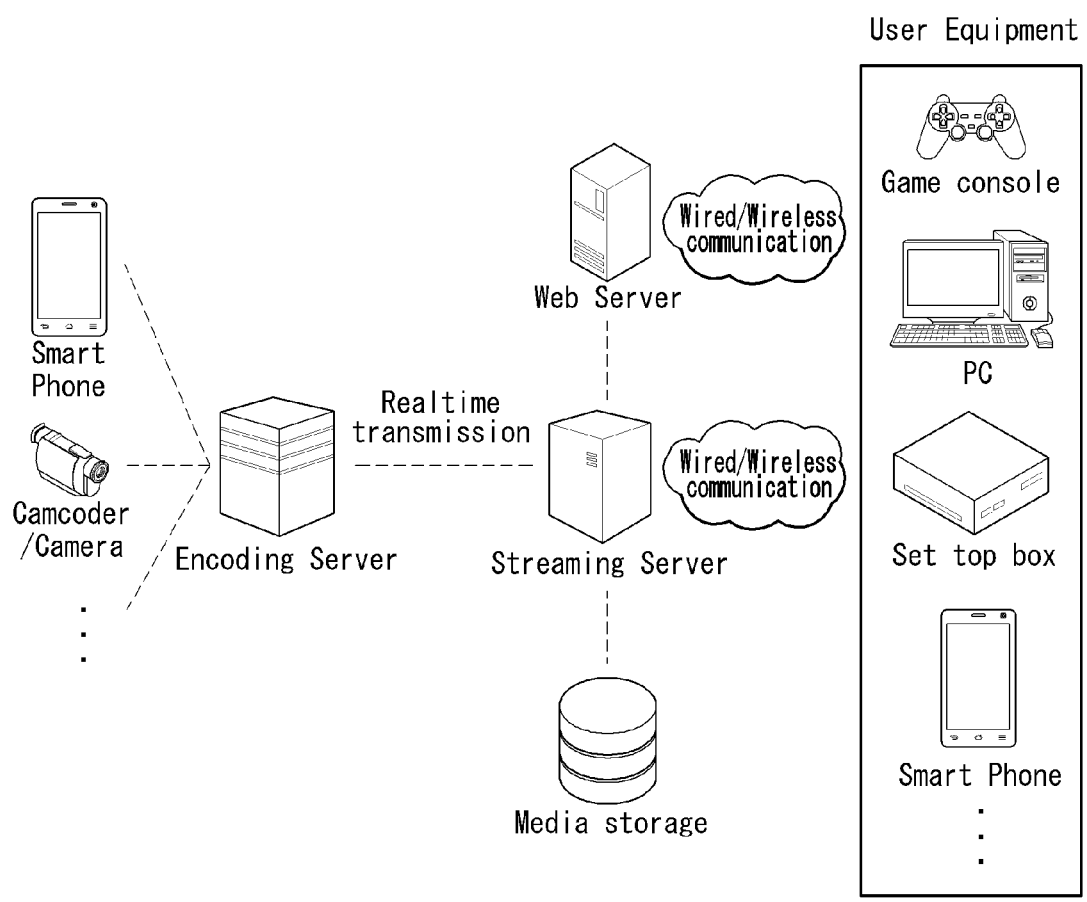

METHOD AND DEVICE FOR DESIGNING LOW-COMPLEXITY CALCULATION DST7

CROSS-REFERENCE TO RELATED APPLICATIONS

This application is the National Stage filing under 35 U.S.C. 371 of International Application No. PCT/KR2019/003742, filed on Mar. 29, 2019, which claims the benefit of Korean Patent Application No. 10-2018-0036810 filed on Mar. 29, 2018, U.S. Provisional Application No. 62/651,240, filed on Apr. 1, 2018 and Korean Patent Application No. 10-2018-0041604 filed on Apr. 10, 2018, the contents of which are all hereby incorporated by reference herein in their entirety.

TECHNICAL FIELD

The present disclosure relates to a method and apparatus for processing a video signal, and more particularly, to a technique for designing low-complexity Discrete Sine Transform-7 (DST7).

BACKGROUND ART

Next-generation video content will have characteristics of a high spatial resolution, a high frame rate, and high dimensionality of scene representation. In order to process such content, technologies, such as memory storage, a memory access rate, and processing power, will be remarkably increased.

Accordingly, it is necessary to design a new coding tool for more efficiently processing next-generation video content. Particularly, it is necessary to design a more efficient transform in terms of coding efficiency and complexity when a transform is applied.

DISCLOSURE

Technical Problem

An object of the present disclosure is to propose an operation algorithm of low-complexity for a transform kernel for video compression.

Another object of the present disclosure is to propose a method for designing low-complexity Discrete Sine Transform-7 (DST7).

Another object of the present disclosure is to propose a method for designing forward DST7 and inverse DST7 in Discrete Fourier Transform (DFT).

Another object of the present disclosure is to propose a method for indexing 2-dimensional DFT used in designing DST7.

Another object of the present disclosure is to propose a method for substituting Winograd FFT (Fast Fourier Transform) blocks with simplified DFT blocks by utilizing symmetry of input/output data and intermediate result values.

Another object of the present disclosure is to propose an encoder/decoder structure for reflecting a new transform design.

Technical Solution

An aspect of the present disclosure provides a method for reducing complexity and improving coding rate through a new transform design.

An aspect of the present disclosure provides, when DST7 is implemented with 2-dimensional DFT, a method for general mapping between an index for equivalent 1-dimensional DFT and an index for 2-dimensional DFT.

An aspect of the present disclosure provides a method for substituting Winograd FFT blocks with simplified DFT blocks by utilizing symmetry between input/output data and intermediate result values.

An aspect of the present disclosure provides a method for substituting Winograd FFT blocks with FFT implemented with different algorithms for each block.

An aspect of the present disclosure provides a method for designing forward DST7 in DFT.

An aspect of the present disclosure provides a method for designing inverse DST7 (or DST6) in DFT.

Advantageous Effects

According to the present disclosure, a method for designing low-complexity Discrete Sine Transform-7 (DST7), memory use and operation complexity may be reduced.

In addition, according to the present disclosure, when a still image or a video image is encoded, a method for more general mapping between an index in 2-dimensional DFT used in DST7 and an index in equivalent 1-dimensional DFT is proposed, and various designing methods may be accommodated.

In addition, according to the present disclosure, Winograd FFT blocks that may include several intermediate calculation steps are substituted by simpler DFT block, and complexity in implementation may be reduced and parallel performance may be increased.

In addition, according to the present disclosure, when a still image or a video image is encoded, forward DST7 and inverse DST7 are designed in DFT, by using FFT algorithm, complexity of DST7 may be reduced.

As such, through a new complexity operation algorithm, operation complexity may be reduced, and coding rate may be improved.

DESCRIPTION OF DRAWINGS

FIG. 1 is a block diagram illustrating the configuration of an encoder for encoding a video signal according to an embodiment of the present invention.

FIG. 2 is a block diagram illustrating the configuration of a decoder for decoding a video signal according to an embodiment of the present invention.

FIG. 3 illustrates embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

FIG. 4 is an embodiment to which the disclosure is applied and illustrates a schematic block diagram of a transform and quantization unit 120/130 and a dequantization and transform unit 140/150 within an encoder.

FIG. 5 is an embodiment to which the disclosure is applied and illustrates a schematic block diagram of a dequantization and transform unit 220/230 within a decoder.

FIG. 6 illustrates a table illustrating a transform configuration group to which Multiple Transform Selection (MTS) is applied as an embodiment to which the present disclosure is applied.

FIG. 7 is a flowchart illustrating an encoding process on which Multiple Transform Selection (MTS) is performed as an embodiment to which the present disclosure is applied.

FIG. 8 is a flowchart illustrating a decoding process on which Multiple Transform Selection (MTS) is performed as an embodiment to which the disclosure is applied.

FIG. 9 is a flowchart for describing a process of encoding an MTS flag and an MTS index as an embodiment to which the disclosure is applied.

FIG. 10 is a flowchart for describing a decoding process of applying a horizontal transform or vertical transform to a row or column based on an MTS flag and an MTS index as an embodiment to which the present disclosure is applied.

FIG. 11 Illustrates a schematic block diagram of the inverse transform unit as an embodiment to which the present disclosure is applied.

FIG. 12 illustrates a block diagram for performing an inverse transform based on a transform related parameter as an embodiment to which the present disclosure is applied.

FIG. 13 illustrates a flowchart for performing an inverse transform based on a transform related parameter as an embodiment to which the present disclosure is applied.

FIG. 14 illustrates an encoding flowchart for performing forward Discrete Sine Transform-7 (DST7) and forward Discrete Cosine Transform-8 (DCT8) in Discrete Fourier Transform (DFT) as an embodiment to which the present disclosure is applied.

FIG. 15 illustrates a decoding flowchart for performing inverse Discrete Sine Transform-7 (DST7) and inverse Discrete Cosine Transform-8 (DCT8) in Discrete Fourier Transform (DFT) as an embodiment to which the present disclosure is applied.

FIG. 16 illustrates a block diagram of 16×16 DST7 designed in eleven 3-point Winograd FFTs and three 11-point Winograd FFTs as an embodiment to which the present disclosure is applied.

FIG. 17 illustrates a block diagram of 32×32 DST7 designed in thirteen 5-point Winograd FFTs and five 13-point Winograd FFTs as an embodiment to which the present disclosure is applied.

FIG. 18 illustrates a simplified implementation block diagram of 16×16 DST as an embodiment to which the present disclosure is applied.

FIG. 19 illustrates a simplified implementation block diagram of 32×32 DST as an embodiment to which the present disclosure is applied.

FIG. 20 illustrates integer coefficients used for multiplication operation of Winograd FFTs as an embodiment to which the present disclosure is applied.

FIG. 21 illustrates the number of operations required for converting a single row or column of length N as an embodiment to which the present disclosure is applied.

FIG. 22 illustrates a content streaming system to which the disclosure is applied.

BEST MODE FOR INVENTION

In an aspect, the present disclosure provides a method for reconstructing a video signal based on low-complexity DST7 design including obtaining a transform index of a current block from the video signal, wherein the transform index corresponds to any one of a plurality of transform combinations including a combination of DST7 and/or DCT8; deriving a transform combination corresponding to the transform index, wherein the transform combination includes a horizontal transform and a vertical transform, and wherein the horizontal transform and the vertical transform correspond to at least one of the DST7 or the DCT8; performing an inverse transform in a vertical direction with respect to the current block by using the DST7; performing an inverse transform in a horizontal direction with respect to the current block by using the DCT8; and reconstructing the video signal by using the current block which the inverse transform is performed, wherein the DST7 includes Discrete Fourier Transform (DFT) and has a different type of DFT structure based on a size of the current block.

In the present disclosure, when the current block is 16×16, wherein the DST7 includes eleven 3-point Winograd FFTs (Fast Fourier Transforms) and three 11-point Winograd FFTs.

In the present disclosure, the DST7 includes 33-point DFT, and wherein the 33-point DFT is defined by an Equation below:

$$\left(X(k) = \sum_{n=0}^{32} x(n) W_N^{nk} \quad W_N = e^{-j(2\pi/33)},\right.$$

herein, n indicates an index for an input data, and k indicates an index form a transform coefficient).

In the present disclosure, when the current block is 32×32, wherein the DST7 includes thirteen 5-point Winograd FFTs (Fast Fourier Transforms) and five 13-point Winograd FFTs.

In the present disclosure, the DST7 includes 65-point DFT, and wherein the 65-point DFT is defined by an Equation below:

$$\left(X(k) = \sum_{n=0}^{64} x(n) W_N^{nk} \quad W_N = e^{-j(2\pi/65)},\right.$$

herein, n indicates an index for an input data, and k indicates an index form a transform coefficient).

In the present disclosure, wherein each of output data of the eleven 3-point Winograd FFTs or the thirteen 5-point Winograd FFTs has symmetry.

In the present disclosure, an inverse transform of the DST7 is applied for each column when the vertical transform is DST7, and wherein the inverse transform of the DCT8 is applied for each row when the horizontal transform is the DCT8.

In another aspect, the present disclosure provides, an apparatus for reconstructing a video signal based on low-complexity DST7 design including a parsing unit for obtaining a transform index of a current block from the video signal, wherein the transform index corresponds to any one of a plurality of transform combinations including a combination of DST7 and/or DCT8; a transform unit for deriving a transform combination corresponding to the transform index, performing an inverse transform in a vertical direction with respect to the current block by using the DST7, and performing an inverse transform in a horizontal direction with respect to the current block by using the DCT8 wherein the transform combination includes a horizontal transform and a vertical transform, and wherein the horizontal transform and the vertical transform correspond to at least one of the DST7 or the DCT8; and a reconstruction unit for reconstructing the video signal by using the current block which the inverse transform is performed, wherein the DST7 includes Discrete Fourier Transform (DFT) and has a different type of DFT structure based on a size of the current block.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

In the present disclosure, MTS (Multiple Transform Selection, hereinafter, referred to as 'MTS') may mean a method for performing a transform by using at least two transform types. This may also be represented as AMT (Adaptive Multiple Transform) or EMT (Explicit Multiple Transform), and similarly, represented as mts_idx, AMT_idx, EMT_idx, tu_mts_idx, AMT_TU_idx, EMT_TU_idx, transform index or transform combination index, but the present disclosure is not limited thereto.

FIG. 1 shows a schematic block diagram of an encoder for encoding a video signal, in accordance with one embodiment of the present invention.

Referring to FIG. 1, the encoder 100 may include an image segmentation unit 110, a transform unit 120, a quantization unit 130, a dequantization unit 140, an inverse transform unit 150, a filtering unit 160, a decoded picture buffer (DPB) 170, an inter-prediction unit 180, an intra-predictor 185 and an entropy encoding unit 190.

The image segmentation unit 110 may segment an input image (or a picture or frame), input to the encoder 100, into one or more processing units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter prediction unit 180 or intra prediction unit 185 from the input image signal. The generated residual signal may be transmitted to the transform unit 120.

The transform unit 120 may generate a transform coefficient by applying a transform scheme to a residual signal. The transform process may be applied a block (square or rectangle) split by a square block of a quadtree structure or a binary tree structure, a ternary structure or an asymmetric structure.

The transform unit 120 may perform a transform based on a plurality of transforms (or transform combinations), and such a transform scheme may be called MTS (Multiple Transform Selection). The MTS may also be called AMT (Adaptive Multiple Transform) or EMT (Enhanced Multiple Transform).

The MTS (or AMT, EMT) may mean a transform scheme performed based on a transform (or transform combinations) which is adaptively selected from a plurality of transforms (or transform combinations).

The plurality of transforms (or transform combinations) may include a transform (or transform combinations) described in FIG. 6 of the present disclosure. In the present disclosure, the transform or transform type may be denoted such as DCT-Type 2, DCT-II and DCT2.

The transform unit 120 may perform the following embodiments.

According to the present disclosure, forward DST7 may be designed in DFT. For example, 1-dimensional 33-point Winograd FFT required in 16×16 DST7 and 1-dimensional 65-point Winograd FFT required in 32×32 DST7 may be divided into equivalent 2-dimensional DFTs having shorter Winograd FFTs. As such, DST7 is implemented with Winograd FFT, and repeated calculation may be removed, and low-complexity DST7 may be designed.

In one embodiment, the DST7 includes Discrete Fourier Transform (DFT) and has a different type of DFT structure based on a size of the current block.

In one embodiment, when the current block is 16×16, the DST7 includes eleven 3-point Winograd FFTs (Fast Fourier Transforms) and three 11-point Winograd FFTs.

In one embodiment, the DST7 includes 33-point DFT, and the 33-point DFT is defined by an Equation below:

$$\left( X(k) = \sum_{n=0}^{32} x(n) W_N^{nk} \ \ W_N = e^{-j(2\pi/33)}, \right.$$

herein, n indicates an index for an input data, and k indicates an index form a transform coefficient).

In one embodiment, when the current block is 32×32, the DST7 includes thirteen 5-point Winograd FFTs (Fast Fourier Transforms) and five 13-point Winograd FFTs.

In one embodiment, the DST7 includes 65-point DFT, and the 65-point DFT is defined by an Equation below:

$$\left( X(k) = \sum_{n=0}^{64} x(n) W_N^{nk} \ \ W_N = e^{-j(2\pi/65)}, \right.$$

herein, n indicates an index for an input data, and k indicates an index form a transform coefficient).

In one embodiment, each of output data of the eleven 3-point Winograd FFTs or the thirteen 5-point Winograd FFTs has symmetry.

Detailed embodiments thereof are described more specifically in the disclosure.

The quantization unit 130 may quantize a transform coefficient and transmit it to the entropy encoding unit 190. The entropy encoding unit 190 may entropy-code a quantized signal and output it as a bitstream.

The transform unit 120 and the quantization unit 130 are described as separate function units, but the disclosure is not limited thereto. The transform unit 120 and the quantization unit 130 may be combined into a single function unit. Likewise, the dequantization unit 140 and the transform unit 150 may be combined into a single function unit.

The quantized signal output by the quantization unit 130 may be used to generate a prediction signal. For example, a residual signal may be reconstructed by applying dequantization and an inverse transform to the quantized signal through the dequantization unit 140 and the transform unit 150 within a loop. A reconstructed signal may be generated by adding the reconstructed residual signal to a prediction signal output by the inter prediction unit 180 or the intra prediction unit 185.

Meanwhile, an artifact in which a block boundary appears may occur due to a quantization error occurring in such a compression process. Such a phenomenon is called a blocking artifact, which is one of important factors in evaluating picture quality. In order to reduce such an artifact, a filtering process may be performed. Picture quality can be improved by reducing an error of a current picture while removing a blocking artifact through such a filtering process.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform a temporal prediction and/or a spatial prediction on the reconstructed picture in order to remove temporal redundancy and/or spatial redundancy. In this case, the reference picture used for the prediction may be a transformed signal obtained via the quantization and dequantization on a block basis in the previous encoding/decoding. Thus, this may result in blocking artifacts or ringing artifacts.

Accordingly, in order to solve the performance artifact attributable to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in a reconstructed picture. An interpolation method may include linear interpolation, bi-linear interpolation, a Wiener filter, etc.

The interpolation filter is applied to a reconstructed picture, and thus can improve the precision of a prediction. For example, the inter prediction unit 180 may generate an interpolated pixel by applying the interpolation filter to an integer pixel, and may perform a prediction using an interpolated block configured with interpolated pixels as a prediction block.

Meanwhile, the intra prediction unit 185 may predict a current block with reference to samples peripheral to a block to be now encoded. The intra prediction unit 185 may perform the following process in order to perform intra prediction. First, the prediction unit may prepare a reference sample necessary to generate a prediction signal. Furthermore, the prediction unit may generate a prediction signal using the prepared reference sample. Thereafter, the prediction unit encodes a prediction mode. In this case, the reference sample may be prepared through reference sample padding and/or reference sample filtering. The reference sample may include a quantization error because a prediction and reconstruction process has been performed on the reference sample. Accordingly, in order to reduce such an error, a reference sample filtering process may be performed on each prediction mode used for intra prediction.

The prediction signal generated through the inter prediction unit 180 or the intra prediction unit 185 may be used to generate a reconstructed signal or may be used to generate a residual signal.

FIG. 2 is a block diagram illustrating the configuration of a decoder for decoding a video signal according to an embodiment of the present invention.

Referring to FIG. 2, the decoder 200 may be configured to include a parsing unit (not illustrated), an entropy decoding unit 210, a dequantization unit 220, a transform unit 230, a filter 240, a decoded picture buffer (DPB) 250, an inter prediction unit 260 and an intra prediction unit 265.

Furthermore, a reconstructed image signal output through the decoder 200 may be played back through a playback device.

The decoder 200 may receive a signal output by the encoder 100 of FIG. 1. The received signal may be entropy-decoded through the entropy decoding unit 210.

The dequantization unit 220 obtains a transform coefficient from the entropy-decoded signal using quantization step size information.

The transform unit 230 obtains a residual signal by inverse-transforming the transform coefficient.

In this case, the disclosure provides a method of configuring a transform combination for each transform configuration group distinguished based on at least one of a prediction mode, a block size or a block shape. The transform unit 230 may perform an inverse transform based on a transform combination configured by the disclosure. Furthermore, embodiments described in the disclosure may be applied.

The inverse transformer 230 may perform the following embodiments.

According to the present disclosure, forward DST7 may be designed in DFT. For example, 1-dimensional 33-point Winograd FFT required in 16×16 DST7 and 1-dimensional 65-point Winograd FFT required in 32×32 DST7 may be divided into equivalent 2-dimensional DFTs having shorter Winograd FFTs. As such, DST7 is implemented with Winograd FFT, and repeated calculation may be removed, and low-complexity DST7 may be designed.

In one embodiment, the DST7 includes Discrete Fourier Transform (DFT) and has a different type of DFT structure based on a size of the current block.

In one embodiment, when the current block is 16×16, wherein the DST7 includes eleven 3-point Winograd FFTs (Fast Fourier Transforms) and three 11-point Winograd FFTs.

In one embodiment, the DST7 includes 33-point DFT, and wherein the 33-point DFT is defined by an Equation below:

$$\left(X(k) = \sum_{n=0}^{32} x(n)W_N^{nk} \ W_N = e^{-j(2\pi/33)},\right.$$

herein, n indicates an index for an input data, and k indicates an index form a transform coefficient).

In one embodiment, when the current block is 32×32, wherein the DST7 includes thirteen 5-point Winograd FFTs (Fast Fourier Transforms) and five 13-point Winograd FFTs.

In one embodiment, the DST7 includes 65-point DFT, and wherein the 65-point DFT is defined by an Equation below:

$$\left(X(k) = \sum_{n=0}^{64} x(n)W_N^{nk} \ W_N = e^{-j(2\pi/65)},\right.$$

herein, n indicates an index for an input data, and k indicates an index form a transform coefficient).

In one embodiment, each of output data of the eleven 3-point Winograd FFTs or the thirteen 5-point Winograd FFTs has symmetry.

In one embodiment, an inverse transform of the DST7 is applied for each column when the vertical transform is DST7, and wherein the inverse transform of the DCT8 is applied for each row when the horizontal transform is the DCT8.

The dequantization unit 220 and the inverse transform unit 230 are described as separate functional units, but the present disclosure is not limited thereto, and may be combined into a single functional unit.

By adding the obtained residual signal to the prediction signal output from the inter predictor 260 or the intra predictor 265, a reconstructed signal is generated.

The filter 240 applies filtering to the reconstructed signal and outputs it to a playback device or transmits it to the decoded picture buffer 250. The filtered signal transmitted to the decoded picture buffer 250 may be used as a reference picture in the inter predictor 260.

In the present disclosure, the embodiments described in the transform unit 120 of the encoder 100 and each of the functional units may be identically applied to the inverse transform unit 230 of the decoder and the corresponding functional units.

FIG. 3 illustrates embodiments to which the disclosure may be applied, FIG. 3A is a diagram for describing a block split structure based on a quadtree (hereinafter referred to as a "QT"), FIG. 3B is a diagram for describing a block split structure based on a binary tree (hereinafter referred to as a "BT"), FIG. 3C is a diagram for describing a block split structure based on a ternary tree (hereinafter referred to as a "TT"), and FIG. 3D is a diagram for describing a block split structure based on an asymmetric tree (hereinafter referred to as an "AT").

In video coding, one block may be split based on a quadtree (QT). Furthermore, one subblock split by the QT may be further split recursively using the QT. A leaf block that is no longer QT split may be split using at least one method of a binary tree (BT), a ternary tree (TT) or an asymmetric tree (AT). The BT may have two types of splits of a horizontal BT (2N×N, 2N×N) and a vertical BT (N×2N, N×2N). The TT may have two types of splits of a horizontal TT (2N×1/2N, 2N×N, 2N×1/2N) and a vertical TT (1/2N×2N, N×2N, 1/2N×2N). The AT may have four types of splits of a horizontal-up AT (2N×1/2N, 2N×3/2N), a horizontal-down AT (2N×3/2N, 2N×1/2N), a vertical-left AT (1/2N×2N, 3/2N×2N), and a vertical-right AT (3/2N×2N, 1/2N×2N). Each BT, TT, or AT may be further split recursively using the BT, TT, or AT.

FIG. 3A shows an example of a QT split. A block A may be split into four subblocks A0, A1, A2, and A3 by a QT. The subblock A1 may be split into four subblocks B0, B1, B2, and B3 by a QT.

FIG. 3B shows an example of a BT split. A block B3 that is no longer split by a QT may be split into vertical BTs C0 and C1 or horizontal BTs D0 and D1. As in the block C0, each subblock may be further split recursively like the form of horizontal BTs E0 and E1 or vertical BTs F0 and F1.

FIG. 3C shows an example of a TT split. A block B3 that is no longer split by a QT may be split into vertical TTs C0, C1, and C2 or horizontal TTs D0, D1, and D2. As in the block C1, each subblock may be further split recursively like the form of horizontal TTs E0, E1, and E2 or vertical TTs F0, F1, and F2.

FIG. 3D shows an example of an AT split. A block B3 that is no longer split by a QT may be split into vertical ATs C0 and C1 or horizontal ATs D0 and D1. As in the block C1, each subblock may be further split recursively like the form of horizontal ATs E0 and E1 or vertical TTs F0 and F1.

Meanwhile, BT, TT, and AT splits may be split together. For example, a subblock split by a BT may be split by a TT or AT. Furthermore, a subblock split by a TT may be split by a BT or AT. A subblock split by an AT may be split by a BT or TT. For example, after a horizontal BT split, each subblock may be split into vertical BTs or after a vertical BT split, each subblock may be split into horizontal BTs. The two types of split methods are different in a split sequence, but have the same finally split shape.

Furthermore, if a block is split, the sequence that the block is searched may be defined in various ways. In general, the search is performed from left to right or from top to bottom. To search a block may mean a sequence for determining whether to split an additional block of each split subblock or may mean a coding sequence of each subblock if a block is no longer split or may mean a search sequence when information of another neighbor block is referred in a subblock.

FIGS. 4 and 5 illustrate embodiments to which the present disclosure is applied. FIG. 4 illustrates a schematic block diagram of the transform and quantization units 120/130 and the dequantization and inverse transform units 140/150 in the encoder, and FIG. 5 illustrates a schematic block diagram of dequantization and inverse transform units 220/230 in the decoder.

Referring to FIG. 4, the transform and quantization units 120/130 may include a primary transform unit 121, a secondary transform unit 122 and the quantization unit 130. The dequantization and inverse transform units 140/150 may include the dequantization unit 140, an inverse secondary transform unit 151 and an inverse primary transform unit 152.

Referring to FIG. 5, the dequantization and transform unit 220/230 may include the dequantization unit 220, an inverse secondary transform unit 231 and an inverse primary transform unit 232.

In the present disclosure, when a transform is performed, the transform may be performed through a plurality of steps. For example, as shown in FIG. 4, two steps of a primary transform and a secondary transform may be applied or more transform steps may be used according to an algorithm. In this case, the primary transform may be referred to as a core transform.

The primary transform unit 121 may apply a primary transform for a residual signal. In this case, the primary transform may be predefined in a table form in the encoder and/or the decoder.

A discrete cosine transform type 2 (hereinafter, referred to as "DCT2") may be applied to the primary transform. Alternatively, a discrete sine transform-type 7 (hereinafter, referred to as "DST7") may be applied to a specific case. For example, in the intra prediction mode, the DST7 may be applied to a 4×4 block.

Furthermore, for the primary transform case, combinations of several transforms (DST 7, DCT 8, DST 1 and DCT 5) of the Multiple Transform Selection (MTS) may be applied to the primary transform. For example, FIG. 6 may be applied.

The secondary transform unit 122 may apply a secondary transform to the primary transformed signal. In this case, the secondary transform may be predefined in a table form in the encoder and/or the decoder.

In an embodiment, a non-separable secondary transform (hereinafter "NSST") may be conditionally applied to the secondary transform. For example, the NSST is applied to only an intra prediction block and may have a transform set which may be applied to each prediction mode group.

In this case, the prediction mode group may be configured based on symmetry for a prediction direction. For example, prediction mode 52 and prediction mode 16 are symmetrical with respect to prediction mode 34 (diagonal direction) and may form a single group. Accordingly, the same transform set may be applied to the single group. In this case, when a transform for prediction mode 52 is applied, it is applied after input data is transposed. The reason for this is that the transform set for prediction mode 16 is the same as that for prediction mode 52.

Meanwhile, the planar mode and the DC mode have respective transform sets because symmetry for direction is not present, the respective transform set may be configured with two transforms. The remaining directional mode may be configured with three transforms for each transform set.

In another embodiment, in the case of the secondary transform, combinations of several transforms (DST 7, DCT 8, DST 1 and DCT 5) of Multiple Transform Selection (MTS) may be applied. For example, FIG. 6 may be applied.

In another embodiment, DST7 may be applied as the secondary transform.

In another embodiment, the NSST is not applied to whole area of primary transformed block but may be applied to only a top-left 8×8 area. For example, in the case that the size of a block is 8×8 or more, an 8×8 NSST is applied. In the case that the size of a block is less than 8×8, a 4×4 NSST is applied, and in this case, after the block is split into 4×4 blocks, a 4×4 NSST is applied to each of the blocks.

In another embodiment, the 4×4 NSST may be applied even in the case of 4×N/N×4 (N>=16).

The quantization unit 130 may perform quantization on the secondary transformed signal.

The dequantization and transform unit 140/150 inversely performs the process described above, and a repeated description thereof is omitted.

FIG. 5 illustrates a schematic block diagram of a dequantization and transform unit 220/230 within the decoder.

Referring to FIG. 5, the dequantization and transform unit 220/230 may include the dequantization unit 220, an inverse secondary transform unit 231 and an inverse primary transform unit 232.

The dequantization unit 220 obtains a transform coefficient from an entropy-decoded signal using quantization step size information.

The inverse secondary transform unit 231 performs an inverse secondary transform on the transform coefficient. In this case, the inverse secondary transform indicates an inverse transform of the secondary transform described in FIG. 4.

In another embodiment, in the case of the secondary transform, combinations of several transforms (DST 7, DCT 8, DST 1 and DCT 5) of Multiple Transform Selection (MTS) may be applied. For example, FIG. 6 may be applied.

The inverse primary transform unit 232 performs an inverse primary transform on the inverse secondary transformed signal (or block) and obtains a residual signal. In this case, the inverse primary transform indicates an inverse transform of the primary transform described in FIG. 4.

In one embodiment, in the case of the primary transform, combinations of several transforms (DST 7, DCT 8, DST 1 and DCT 5) of Multiple Transform Selection (MTS) may be applied. For example, FIG. 6 may be applied.

In one embodiment of the present disclosure, DST7 may be applied as the secondary transform.

In one embodiment of the present disclosure, DCT8 may be applied as the primary transform.

The disclosure provides a method of configuring a transform combination for each transform configuration group distinguished by at least one of a prediction mode, a block size or a block shape. The inverse primary transform unit 232 may perform an inverse transform based on a transform combination configured by the disclosure. Furthermore, embodiments described in the disclosure may be applied.

FIG. 6 illustrates a table illustrating a transform configuration group to which Multiple Transform Selection (MTS) is applied as an embodiment to which the present disclosure is applied.

Transform Configuration Group to which Multiple Transform Selection (MTS) is Applied In the present disclosure, an j-th transform combination candidate for a transform configuration group $G_i$ is indicated in pairs as represented in Equation 1.

$$(H(G_i,j), V(G_i,j)) \qquad \text{[Equation 1]}$$

In this case, $H(G_i, j)$ indicates a horizontal transform.

In this case, $H(G_i, j)$ indicates a horizontal transform for an j-th candidate, and $V(G_i, j)$ indicates a vertical transform for the j-th candidate. For example, in FIG. 6, it is indicated that $H(G_3, 2)$=DST7, $V(G_3, 2)$=DCT8. According to the context, a value assigned to $H(G_i, j)$ or $V(G_i, j)$ may be a nominal value for distinguishing transforms as described in the example or may be an index value indicating a corresponding transform or may be a 2-dimensional matrix (2D matrix) for a corresponding transform.

Furthermore, in the present disclosure, 2D matrix values for a DCT and a DST may be represented as Equations 2 to 3 below.

$$\text{DCT type 2: } C_N^{II}, \text{DCT type 8: } C_N^{VIII} \qquad \text{[Equation 2]}$$

$$\text{DST type 7: } S_N^{VII}, \text{DST type 4: } S_N^{IV} \qquad \text{[Equation 3]}$$

In this case, whether a transform is a DST or a DCT is indicated as S or C, a type number is indicated as a superscript in the form of a Roman number, and N of a subscript indicates an N×N transform. Furthermore, it is assumed that in the 2D matrices, such as $C_N^{II}$ and $S_N^{IV}$, column vectors form a transform basis.

Referring to FIG. 6, transform configuration groups may be determined based on a prediction mode, and the number of groups may be a total of 6 G0 to G5. Furthermore, G0 to G4 corresponds to a case where an intra prediction is applied, and G5 indicates transform combinations (or transform set, the transform combination set) applied to a residual block generated by an inter prediction.

One transform combination may be configured with a horizontal transform (or row transform) applied to the rows of a corresponding 2D block and a vertical transform (or column transform) applied to the columns of the corresponding 2D block.

In this case, each of the transform configuration groups may have four transform combination candidates. The four transform combination candidates may be selected or determined through transform combination indices 0 to 3. The encoder may encode a transform combination index and transmit it to the decoder.

In one embodiment, residual data (or a residual signal) obtained through an intra prediction may have different statistical characteristics depending on its intra prediction mode. Accordingly, as shown in FIG. 6, other transforms, not a common cosine transform, may be applied for each intra prediction mode.

FIG. 6 illustrates a case where 35 intra prediction modes are used and a case where 67 intra prediction modes are used. A plurality of transform combinations may be applied to each transform configuration group distinguished in an intra prediction mode column. For example, the plurality of transform combinations may be configured with four (row direction transform, and column direction transform) combinations. As a specific example, in group 0, a total of four combinations are available because DST-7 and DCT-5 may be applied to both a row (horizontal) direction and a column (vertical) direction.

Since a total of four transform kernel combinations may be applied to each intra prediction mode, a transform combination index for selecting one of the four transform kernel combinations may be transmitted for each transform unit. In the present disclosure, the transform combination index may be called an MTS index and may be represented as mts_idx.

Furthermore, in addition to the transform kernels proposed in FIG. 6, a case where DCT-2 is the best for both a row direction and a column direction may occur from the nature of a residual signal. Accordingly, a transform may be adaptively performed by defining an MTS flag for each coding unit. In this case, when the MTS flag is 0, DCT-2 may be applied to both the row direction and the column direction. When the MTS flag is 1, one of the four combinations may be selected or determined through an MTS index.

In one embodiment, when the AMT flag is 1, in the case that the number of non-zero transform coefficient for one transform unit is not greater than a threshold value, DST-7 may be applied to both the row direction and the column direction without applying the transform kernels of FIG. 6. For example, the threshold value may be set to 2, which may be differently set based on the size of a block size or transform unit. This may also be applied to other embodiments of the present disclosure.

In one embodiment, transform coefficient values may be first parsed. In the case that the number of non-zero transform coefficient is not greater than the threshold value, an MTS index is not parsed but DST-7 is applied, thereby being capable of reducing the amount of additional information transmitted.

In one embodiment, when the MTS flag is 1, in the case that the number of non-zero transform coefficient for one transform unit is greater than the threshold value, an MTS index is parsed, and a horizontal transform and a vertical transform may be determined based on the MTS index.

In one embodiment, an MTS may be applied to a case where both the width and height of a transform unit is 32 or less.

In one embodiment, FIG. 6 may be preconfigured through off-line training.

In one embodiment, the MTS index may be defined as one index capable of indicating a combination of a horizontal transform and a vertical transform. Alternatively, the MTS index may separately define a horizontal transform index and a vertical transform index.

In one embodiment, the MTS flag or the MTS index may be defined in at least one level of a sequence, a picture, a slice, a block, a coding unit, a transform unit or a prediction unit. For example, the MTS flag or the MTS index may be defined in at least one of a sequence parameter set (SPS) or a transform unit.

FIG. 7 is a flowchart illustrating an encoding process on which Multiple Transform Selection (MTS) is performed as an embodiment to which the present disclosure is applied.

In the present disclosure, basically, an embodiment in which transforms are separately applied to a horizontal direction and a vertical direction is described, but a transform combination may be configured with non-separable transforms.

Alternatively, separable transforms and non-separable transforms may be mixed and configured. In this case, when a non-separable transform is used, selecting transform for each row/column or for each horizontal/vertical direction is not necessary, and the transform combinations of FIG. 6 may be used only when separable transforms are selected.

Furthermore, the methods proposed in the present disclosure may be applied regardless of a primary transform or a secondary transform. That is, there is no limitation that the methods need to be applied to only either one of a primary transform or a secondary transform and may be applied to both. In this case, the primary transform may mean a transform for first transforming a residual block, and the secondary transform may mean a transform for applying a transform to a block generated as the results of the primary transform.

First, the encoder may determine a transform configuration group corresponding to a current block (step, S710). In this case, the transform configuration group may mean the transform configuration group shown in FIG. 6, but the present disclosure is not limited thereto. The transform configuration group may be configured with other transform combinations.

The encoder may perform a transform on available candidate transform combinations within the transform configuration group (step, S720).

The encoder may determine or select a transform combination having the smallest rate distortion (RD) cost based on a result of performing the transform (step, S730).

The encoder may encode a transform combination index corresponding to the selected transform combination (step, S740).

FIG. 8 is a flowchart illustrating a decoding process on which Multiple Transform Selection (MTS) is performed as an embodiment to which the disclosure is applied.

First, the decoder may determine a transform configuration group for a current block (step, S810).

The decoder may parse (or obtain) a transform combination index from a video signal. In this case, the transform combination index may correspond to anyone of a plurality of transform combinations within the transform configuration group (step, S820). For example, the transform configuration group may include discrete sine transform type 7 (DST7) and discrete cosine transform type 8 (DCT8). The transform combination index may be called an MTS index.

In one embodiment, the transform configuration group may be configured based on at least one of a prediction mode, block size or block shape of a current block.

The decoder may derive a transform combination corresponding to the transform combination index (step, S830). In this case, the transform combination is configured with a horizontal transform and a vertical transform and may include at least one of the DST-7 or the DCT-8.

Furthermore, the transform combination may mean the transform combination described in FIG. 6, but the present disclosure is not limited thereto. That is, a configuration based on another transform combination according to another embodiment of the present disclosure is possible.

The decoder may perform an inverse transform on the current block based on the transform combination (step, S840). In the case that the transform combination is configured with a row (horizontal) transform and a column (vertical) transform, after the row (horizontal) transform is first applied, the column (vertical) transform may be applied. In this case, the present disclosure is not limited thereto and may be reversely applied or in the case that the transform combination is configured with non-separable transforms, the non-separable transforms may be immediately applied.

In one embodiment, in the case that the vertical transform or the horizontal transform is the DST-7 or DCT-8, an inverse transform of the DST-7 or an inverse transform of the DCT-8 may be applied for each column and then applied for each row.

In one embodiment, the vertical transform or the horizontal transform may be differently applied to each row and/or each column.

In one embodiment, the transform combination index may be obtained based on an MTS flag indicating whether an MTS is performed. That is, the transform combination index may be obtained in the case that an MTS is performed based on the MTS flag.

In one embodiment, the decoder may check whether the number of non-zero transform coefficient is greater than a threshold. In this case, the transform combination index may be obtained when the number of non-zero transform coefficient is greater than the threshold.

In one embodiment, the MTS flag or the MTS index may be defined in at least one level of a sequence, a picture, a slice, a block, a coding unit, a transform unit or a prediction unit.

In one embodiment, the inverse transform may be applied when both the width and height of a transform unit is 32 or less.

Meanwhile, in another embodiment, the process of determining a transform configuration group and the process of parsing a transform combination index may be performed at the same time. Alternatively, step S810 may be preconfigured in the encoder and/or the decoder and omitted.

FIG. 9 is a flowchart for describing a process of encoding an MTS flag and an MTS index as an embodiment to which the disclosure is applied.

The encoder may determine whether Multiple Transform Selection (MTS) is applied to a current block (step, S910).

In the case that the Multiple Transform Selection (MTS) is applied, the encoder may encode an MTS flag=1 (step, S920).

Furthermore, the encoder may determine an MTS index based on at least one of a prediction mode, horizontal transform, and vertical transform of the current block (step, S930). In this case, the MTS index means an index indicating any one of a plurality of transform combinations for each intra prediction mode, and the MTS index may be transmitted for each transform unit.

When the MTS index is determined, the encoder may encode the MTS index (step, S940).

Meanwhile, in the case that the Multiple Transform Selection (MTS) is not applied, the encoder may encode the MTS flag=0 (step, S950).

FIG. 10 is a flowchart for describing a decoding process of applying a horizontal transform or vertical transform to a row or column based on an MTS flag and an MTS index as an embodiment to which the disclosure is applied.

The decoder may parse an MTS flag from a bitstream (step, S1010). In this case, the MTS flag may indicate whether Multiple Transform Selection (MTS) is applied to a current block.

The decoder may check whether the Multiple Transform Selection (MTS) is applied to the current block based on the AMT flag (step, S1020). For example, the decoder may check whether the MTS flag is 1.

In the case that the MTS flag is 1, the decoder may check whether the number of non-zero transform coefficient is greater than a threshold value (or more) (step, S1030). For example, the threshold value may be set to 2. This may be differently set based on a block size or the size of a transform unit.

In the case that the number of non-zero transform coefficient is greater than the threshold value, the decoder may parse the MTS index (step, S1040). In this case, the MTS index means an index indicating any one of a plurality of transform combinations for each intra prediction mode or inter prediction mode. The MTS index may be transmitted for each transform unit. Alternatively, the MTS index may mean an index indicating any one transform combination defined in a preset transform combination table. The preset transform combination table may mean FIG. 6, but the present disclosure is not limited thereto.

The decoder may derive or determine a horizontal transform and a vertical transform based on at least one of the MTS index or a prediction mode (step, S1050).

Alternatively, the decoder may derive a transform combination corresponding to the MTS index. For example, the decoder may derive or determine a horizontal transform and vertical transform corresponding to the MTS index.

Meanwhile, in the case that the number of non-zero transform coefficient is not greater than a threshold value, the decoder may apply a preset vertical inverse transform to each column (step, S1060). For example, the vertical inverse transform may be an inverse transform of DST7.

Furthermore, the decoder may apply a preset horizontal inverse transform to each row (step, S1070). For example, the horizontal inverse transform may be an inverse transform of DST7. That is, in the case that the number of non-zero transform coefficient is not greater than the threshold, a transform kernel preset in the encoder or the decoder may be used. For example, not the transform kernels defined in the transform combination table of FIG. 6, but commonly used transform kernels may be used.

Meanwhile, when the AMT flag is 0, the decoder may apply a preset vertical inverse transform to each column (step, S1080). For example, the vertical inverse transform may be an inverse transform of DCT-2.

Furthermore, the decoder may apply a preset horizontal inverse transform to each row (step, S1090). For example, the horizontal inverse transform may be an inverse transform of DCT-2. That is, when the AMT flag is 0, a transform kernel preset in the encoder or the decoder may be used. For example, not the transform kernels defined in the transform combination table of FIG. 6, but commonly used transform kernels may be used.

FIG. 11 Illustrates a schematic block diagram of the inverse transform unit as an embodiment to which the present disclosure is applied.

The decoding apparatus to which the present disclosure is applied may include a secondary inverse transform application determination unit (or an element for determining whether a secondary inverse transform is applied) 1110, a secondary inverse transform determination unit (or an element for determining a secondary inverse transform) 1120, a secondary inverse transform unit (or an element for performing a secondary inverse transform) 1130 and a primary inverse transform unit (or an element for performing a primary inverse transform) 1140.

The secondary inverse transform application determination unit 1110 may determine whether to apply the secondary inverse transform. For example, the secondary inverse transform may be Non-Separable Secondary Transform (hereinafter, NSST) or Reduced Secondary Transform (hereinafter, RST). In one example, the secondary inverse transform application determination unit 1110 may determine whether to apply the second inverse transform based on a secondary transform flag received from the encoder. In another example, the secondary inverse transform application determination unit 1110 may determine whether to apply the second inverse transform based on a transform coefficient of a residual block.

The secondary inverse transform determination unit 1120 may determine a secondary inverse transform. In this case, the secondary inverse transform determination unit 1120 determine a secondary inverse transform applied to the current block based on NSST (or RST) designated according to the intra prediction mode.

In addition, in one embodiment, a secondary transform determination method may be determined based on a primary transform determination method. Various combinations of the primary transform and the secondary transform may be determined based on the intra prediction mode.

Furthermore, in one example, the secondary inverse transform determination unit 1120 may determine an area to which a secondary inverse transform is applied based on a size of the current block.

The secondary inverse transform unit 1130 may perform a secondary inverse transform for a dequantized residual block by using the determined secondary inverse transform.

The primary inverse transform unit 1140 may perform a primary inverse transform for a secondary inverse-transformed residual block. The primary transform may be indicated as a core transform. In one embodiment, the primary inverse transform unit 1140 may perform a primary transform by using the MTS described above. In addition, in one example, the primary inverse transform unit 1140 may determine whether the MTS is applied to the current block.

For example, in the case that the MTS is applied to the current block (i.e., tu_mts_flag=1), the primary inverse transform unit 1140 may construct MTS candidates based on the intra prediction mode of the current block. For example, the MTS candidate may be constructed in a combination of DST4 and/or DCT4 or include a combination of DST7 and/or DCT8. Alternatively, the MTS candidate may include at least one of embodiments of FIG. 6 above.

In addition, the primary inverse transform unit 1140 may determine a primary transform applied to the current block by using mts_idx indicating a specific MTS among the constructed MTS candidates.

The embodiments described above may be individually used, but the present disclosure is not limited thereto, and the embodiments may be used in combination of the above embodiment and other embodiments of the present disclosure.

FIG. 12 illustrates a block diagram for performing an inverse transform based on a transform related parameter as an embodiment to which the present disclosure is applied.

The decoder 200 to which the present disclosure is applied may include an element for obtaining a sequence parameter 1210, an element for obtaining a Multiple Transform Selection flag (MTS flag) 1220, an element for obtaining a Multiple Transform Selection index (MTS index) 1230 and an element for deriving a transform kernel 1240.

The element for obtaining a sequence parameter 1210 may obtain sps_mts_intra_enabled_flag or sps_mts_inter_enabled_flag. Here, sps_mts_intra_enabled_flag indicates whether tu_mts_flag is present in a residual coding syntax of an intra coding unit, and sps_mts_inter_enabled_flag indicates whether tu_mts_flag is present in a residual coding syntax of an inter coding unit. As a specific example, the description of FIG. 12 may be applied.

The element for obtaining a Multiple Transform Selection flag (MTS flag) 1220 may obtain tu_mts_flag based on sps_mts_intra_enabled_flag or sps_mts_inter_enabled_flag. For example, when sps_mts_intra_enabled_flag=1 or sps_mts_inter_enabled_flag=1, the element for obtaining a Multiple Transform Selection flag (MTS flag) 1220 may obtain tu_mts_flag. Here, tu_mts_flag may indicate whether the Multiple Transform Selection is applied to a residual sample of a luma transform block. As a specific example, the description of FIG. 12 may be applied.

The element for obtaining a Multiple Transform Selection index (MTS index) 1230 may obtain mts_idx based on tu_mts_flag. For example, when tu_mts_flag=1, the element for obtaining a Multiple Transform Selection index (MTS index) 1230 may obtain mts_idx. Here, mts_idx indicates whether a certain transform kernel is applied to luma residual samples according to horizontal direction and/or vertical direction of the current block. For example, at least one of the embodiments of FIG. 6 above may be applied.

The element for deriving a transform kernel 1240 may derive a transform kernel corresponding to mts_idx.

Furthermore, the decoder 200 may perform an inverse transform based on the transform kernel.

The embodiments described above may be individually used, but the present disclosure is not limited thereto, and the embodiments may be used in combination of the above embodiment and other embodiments of the present disclosure.

FIG. 13 illustrates a flowchart for performing an inverse transform based on a transform related parameter as an embodiment to which the present disclosure is applied.

The decoder to which the present disclosure is applied may obtain sps_mts_intra_enabled_flag or sps_mts_inter_enabled_flag (step, S1310). Here, sps_mts_intra_enabled_flag indicates whether tu_mts_flag is present in a residual coding syntax of an intra coding unit. For example, when sps_mts_intra_enabled_flag=0, tu_mts_flag is not present in a residual coding syntax of an intra coding unit, and when sps_mts_intra_enabled_flag=1, tu_mts_flag is present in a residual coding syntax of an intra coding unit. In addition, sps_mts_inter_enabled_flag indicates whether tu_mts_flag is present in a residual coding syntax of an inter coding unit. For example, when sps_mts_inter_enabled_flag=0, tu_mts_flag is not present in a residual coding syntax of an inter coding unit, and when sps_mts_inter_enabled_flag=0, tu_mts_flag is present in a residual coding syntax of an inter coding unit.

The decoder may obtain tu_mts_flag based on sps_mts_intra_enabled_flag or sps_mts_inter_enabled_flag (step, S1320). For example, when sps_mts_intra_enabled_flag=1 or sps_mts_inter_enabled_flag=1, the decoder may obtain tu_mts_flag. Here, tu_mts_flag may indicate whether the Multiple Transform Selection (hereinafter, referred to as "MTS) is applied to a residual sample of a luma transform block. For example, when tu_mts_flag is 0, the MTS is not applied to a residual sample of a luma transform block, and when tu_mts_flag is 1, the MTS is applied to a residual sample of a luma transform block.

As another example, at least one of the embodiments of the present disclosure may be applied to the tu_mts_flag.

The decoder may obtain mts_idx based on tu_mts_flag (step, S1330). For example, when tu_mts_flag=1, the decoder may obtain mts_idx. Here, mts_idx indicates whether a certain transform kernel is applied to luma residual samples according to horizontal direction and/or vertical direction of the current block.

For example, at least one of the embodiments of the present disclosure may be applied to the mts_idx. As a specific example, at least one of the embodiments of FIG. 6 above may be applied.

The decoder may derive a transform kernel corresponding to mts_idx (step, S1340). For example, a transform kernel corresponding to the mts_idx may be defined as a horizontal transform and a vertical transform in a distinguished manner.

In another example, different transform kernels may be applied to the horizontal transform and the vertical transform. However, the present disclosure is not limited thereto, and the same transform kernels may be applied to the horizontal transform and the vertical transform.

Furthermore, the decoder may perform an inverse transform based on the transform kernel (step, S1350).

The embodiments described above may be individually used, but the present disclosure is not limited thereto, and the embodiments may be used in combination of the above embodiment and other embodiments of the present disclosure.

FIG. 14 illustrates an encoding flowchart for performing forward Discrete Sine Transform-7 (DST7) and forward Discrete Cosine Transform-8 (DCT8) in Discrete Fourier Transform (DFT) as an embodiment to which the present disclosure is applied.

The encoder may determine (or select) a horizontal transform and/or a vertical transform based on at least one of a prediction mode of a current block, a block shape and/or a block size (step, S1410). In this case, the candidates of the horizontal transform and/or the vertical transform may include at least one of the embodiments of FIG. 6 above.

The encoder may determine optimal horizontal transform and/or vertical transform through Rate Distortion (RD) optimization. The optimal horizontal transform and/or the optimal vertical transform may correspond to one of a plurality of transform combinations, and the plurality of transform combinations may be defined by transform indexes.

The encoder may signal a transform index that corresponds to the optimal horizontal transform and/or the optimal vertical transform (step, S1420). In this case, other embodiments described in the present disclosure may be applied to the transform index. For example, the embodiments may include at least one of the embodiments of FIG. 6 above.

In another example, a horizontal transform index for the optimal horizontal transform and a vertical transform index for the optimal vertical transform may be independently signaled.

The encoder may perform a forward transform in a horizontal direction for the current block by using the optimal horizontal transform (step, S1430). In this case, the current block may mean a transform block, and the optimal horizontal transform may be forward DCT8.

Furthermore, the encoder may perform a forward transform in a vertical direction for the current block by using the optimal vertical transform (step, S1440). In this embodiment, the optimal vertical transform may be forward DST7, and the forward DST7 may be designed in DFT. For example, 1-dimensional 33-point Winograd FFT required in 16×16 DST7 and 1-dimensional 65-point Winograd FFT required in 32×32 DST7 may be divided into equivalent 2-dimensional DFTs having shorter Winograd FFTs. As such, DST7 is implemented with Winograd FFT, and repeated calculation may be removed, and accordingly, low-complexity DST7 may be designed.

In one embodiment, the DST7 is constructed in Discrete Fourier Transform (DFT) and has different types of DFT structures based on a size of the current block.

In one embodiment, when the current block is 16×16, the DST7 includes eleven 3-point Winograd FFTs (Fast Fourier Transforms) and three 11-point Winograd FFTs.

In one embodiment, the DST7 includes 33-point DFT, and the 33-point DFT is defined by an Equation below:

$$\left(X(k) = \sum_{n=0}^{32} x(n) W_N^{nk} \ W_N = e^{-j(2\pi/33)},\right.$$

herein, n indicates an index for an input data, and k indicates an index form a transform coefficient).

In one embodiment, when the current block is 32×32, the DST7 includes thirteen 5-point Winograd FFTs (Fast Fourier Transforms) and five 13-point Winograd FFTs.

In one embodiment, the DST7 includes 65-point DFT, and the 65-point DFT is defined by an Equation below:

$$\left(X(k) = \sum_{n=0}^{64} x(n) W_N^{nk} \ W_N = e^{-j(2\pi/65)},\right.$$

herein, n indicates an index for an input data, and k indicates an index form a transform coefficient).

In one embodiment, each of output data of the eleven 3-point Winograd FFTs or the thirteen 5-point Winograd FFTs has symmetry.

In the present embodiment, the vertical transform is performed after the horizontal transform is performed, but the present disclosure is not limited thereto. That is, the horizontal transform may be performed after the vertical transform is performed first.

In one embodiment, a combination of the horizontal transform and the vertical transform may include at least one of the embodiments of FIG. 6 above.

Meanwhile, the encoder may generate a transform coefficient block by performing a quantization for the current block (step, S1450).

The encoder may generate a bitstream by performing an entropy encoding for the transform coefficient block.

FIG. 15 illustrates a decoding flowchart for performing inverse Discrete Sine Transform-7 (DST7) and inverse Discrete Cosine Transform-8 (DCT8) in Discrete Fourier Transform (DFT) as an embodiment to which the present disclosure is applied.

The decoder may obtain a transform index from a bitstream (step, S1510). In this case, different embodiments described in the present disclosure may be applied to the transform index. For example, the embodiment may include at least one of the embodiments of FIG. 6 above.

The decoder may derive a horizontal transform and a vertical transform that correspond to the transform index (step, S1520). In this case, the candidates of the horizontal transform and/or the vertical transform may include at least one of the embodiments of FIG. 6 above.

However, steps S1510 and S1520 are based on just an embodiment, but the present disclosure is not limited thereto. For example, the decoder may derive a horizontal transform and a vertical transform based on at least one of a prediction mode of a current block, a block shape and/or a block size. In another embodiment, the transform index may include a horizontal transform index for the horizontal transform and a vertical transform index for the vertical transform.

Meanwhile, the decoder may obtain a transform coefficient block by entropy-decoding the bitstream and perform a dequantization for the transform coefficient block (step, S1530).

The decoder may perform an inverse direction transform in a vertical direction by using the vertical transform the dequantized transform coefficient block (step, S1540). In this case, the vertical transform may correspond to DST7. That is, the decoder may apply inverse DST7 with respect to the dequantized transform coefficient block.

In the present disclosure, the DST7 may be designed in DFT. For example, 1-dimensional 33-point Winograd FFT required in 16×16 DST7 and 1-dimensional 65-point Winograd FFT required in 32×32 DST7 may be divided into equivalent 2-dimensional DFTs having shorter Winograd FFTs. As such, DST7 is implemented with Winograd FFT, and repeated calculation may be removed, and accordingly, low-complexity DST7 may be designed.

In one embodiment, the DST7 is constructed in Discrete Fourier Transform (DFT) and has different types of DFT structures based on a size of the current block.

In one embodiment, when the current block is 16×16, the DST7 includes eleven 3-point Winograd FFTs (Fast Fourier Transforms) and three 11-point Winograd FFTs.

In one embodiment, the DST7 includes 33-point DFT, and the 33-point DFT is defined by an Equation below:

$$\left(X(k) = \sum_{n=0}^{32} x(n) W_N^{nk} \ W_N = e^{-j(2\pi/33)},\right.$$

herein, n indicates an index for an input data, and k indicates an index form a transform coefficient).

In one embodiment, when the current block is 32×32, the DST7 includes thirteen 5-point Winograd FFTs (Fast Fourier Transforms) and five 13-point Winograd FFTs.

In one embodiment, the DST7 includes 65-point DFT, and the 65-point DFT is defined by an Equation below:

$$\left(X(k) = \sum_{n=0}^{64} x(n) W_N^{nk} \ W_N = e^{-j(2\pi/65)},\right.$$

herein, n indicates an index for an input data, and k indicates an index form a transform coefficient).

In one embodiment, each of output data of the eleven 3-point Winograd FFTs or the thirteen 5-point Winograd FFTs has symmetry.

In one embodiment, an inverse transform of the DST7 is applied for each column when the vertical transform is DST7, and wherein the inverse transform of the DCT8 is applied for each row when the horizontal transform is the DCT8.

Furthermore, the decoder may perform an inverse direction transform in a horizontal direction by using the horizontal transform (step, S1550). In this case, the horizontal transform may correspond to DCT8. That is, the decoder may apply inverse DCT8 with respect to the dequantized transform coefficient block.

In this embodiment, the horizontal transform is applied after the vertical transform is applied, but the present disclosure is not limited thereto. That is, the vertical transform may be applied after the horizontal transform is applied first.

In one embodiment, a combination of the horizontal transform and the vertical transform may include at least one of the embodiments of FIG. 6 above.

The decoder generates a residual block through step S1550, and a reconstructed block is generated by adding the residual block and a prediction block.

Hereinafter, a method for designing low-complexity Discrete Sine Transform-7 (DST7) is described in detail.

Embodiment 1: Method for Designing Forward DST7 and Inverse DST7 in DFT (Discrete Fourier Transform)

A matrix form of N×N DST7 may be represented as Equation 4 below.

$$[S_N^{VII}]_{n,k} = \frac{2}{\sqrt{2N+1}} \sin\left(\frac{\pi(2k+1)(n+1)}{2N+1}\right), \quad \text{[Equation 4]}$$

$$n, k = 0, 1, \ldots, N-1$$

Herein, n is a row index from 0 to N−1. When k is a row index from 0 to N−1, The matrix of Equation 4 is matched to an inverse DST7 matrix to which transform coefficients are multiplied to reconstruct original inputs.

Accordingly, a transpose matrix of Equation 4 is a forward DST7 matrix. In addition, forward DST7 and inverse DST7 matrixes are orthogonal and have norm 1 as each basis vector therefor.

Based on Equation 4 above, a relation between DST7 and DFT may be established as represented in Equation 5 below.

$$(S_N^{VII})^T = R\mathfrak{J}[F_{2N+1}]QP \quad \text{[Equation 5]}$$

-continued $$\text{where } [R]_{n,k} = \begin{cases} -1, & \text{if } k = 2n+1, n = 0, 1, \ldots, N-1 \\ 0, & \text{otherwise} \end{cases},$$

$$Q = \begin{pmatrix} 0^T \\ I_N \\ -J_N \end{pmatrix}, \text{ and}$$

$$[P]_{n,k} = \begin{cases} 1, \text{if } k+1 = 2(n+1), & n = 0, 1, \ldots, N/2 - 1 \\ 1, \text{if } k+1 = 2(N-n) - 1, & n = N/2, \ldots, N-1 \\ 0, \text{otherwise} \end{cases}$$

In Equation 5 above, R is a N×(2N+1) matrix (number× column of row), Q is a (2N+1)×N matrix, and P is a N×N matrix. $I_N$ represents a N×N identity matrix, and $J_N$ represents $$[J_N]_{ij,i,j=0,\ldots,N-1} = \begin{cases} 1, & j = N-1-i \\ 0, & \text{otherwise} \end{cases}$$

In Equation 5 above, $\Im[F_{2N+1}]$ means that only an imaginary part of DFT result is taken. Equation 5 above is held only when N is even number. In detail, $\Im[F_{2N+1}]$ means that when x input to forward DST is N×1 vector, and when z=QPx is calculated, (2N+1)×1 vector (z) is output, and only an imaginary part is taken after DFT of 2N+1 length is performed with the vector (z) as an input.

As represented in Equation 5 above, matrixes P, Q and R perform rearrangement of N inputs and assignment of their signs (+/−) only such that a main calculation part becomes 2N+1 length DFT.

In the present disclosure, DST7 of 2n×2n (N=2n) size is used. Accordingly, 9-point DFT, 17-point DFT, 33-point DFT and 65-point DFT may be applied in the case that N=4, 8, 16 and 32, respectively.

In the present disclosure, the cases of N=16 and 32 are mainly described. In addition, designs of the corresponding DFTs are introduced in an equivalent multi-dimensional DFT form, and a method for integrating them is provided to obtain low-complexity DST7.

Inverse N×N DST7 identical to forward DST6 may be represented as 2N+1 length DFT as in Equation 6 below.

$$S_N^{VII} = R\mathcal{J}[F_{2N+1}]Q, \quad \text{[Equation 6]}$$

$$[R]_{n,k} = \begin{cases} 1, & \text{if } k = n+1, n = 1, 3, \ldots, N-1 \\ -1, & \text{if } k = n+1, n = 0, 2, \ldots, N-2 \\ 0, & \text{otherwise} \end{cases},$$

where $$Q = \begin{pmatrix} 0^T \\ J_N \\ -I_N \end{pmatrix}$$

In Equation 5 above, R is a N×(2N+1) matrix (number× column of row), Q is a (2N+1)×N matrix, and 1N represents a N×N identity matrix, and the definition of $J_N$ is as represented in Equation 5 above ($I_N$ and $J_N$ are identical in Equation 6).

$\Im[F_2N+]$ means that when x input to forward DST is N×1 vector, and when z=QPx is calculated, (2N+1)×1 vector (z) is output, and only an imaginary part is taken after DFT of 2N+1 length is performed with the vector (z) as an input. That is, the meaning of $\Im[F_2N+]$ is the same as the definition in Equation 5 above except the calculation of z=QPx.

In Equation 6, N is an even number. In addition, even for inverse DST7, 2N+1 length DFT which is the same as in the forward DST7 may be reused.

FIG. 16 illustrates a block diagram of 16×16 DST7 designed in eleven 3-point Winograd FFTs and three 11-point Winograd FFTs as an embodiment to which the present disclosure is applied.

The present disclosure is to propose a method for designing forward DST7 and inverse DST7 in Discrete Fourier Transform (DFT).

Embodiment 2: Low-Complexity DST7 Structures Having 2-Dimensional FFT

Equations for 33-point DFT and 65-point DFT are as represented in Equations 7 and 8 below.

$$X(k) = \sum_{n=0}^{32} x(n) W_N^{nk} \quad W_N = e^{-j(2\pi/33)} \quad \text{[Equation 7]}$$

$$X(k) = \sum_{n=0}^{64} x(n) W_N^{nk} \quad W_N = e^{-j(2\pi/65)} \quad \text{[Equation 8]}$$

Equation 7 above represents 33-point 1-dimensional DFT for 16×16 DST7 design, and Equation 8 above represents 65-point 1-dimensional DFT for 32×32 DST7 design. Herein, n indicates an index for an input data, and k indicates an index for a transform coefficient.

Hereinafter, a residue of a number is denoted as $\langle x \rangle = x \mod N$. In addition, four index variables $n_1$, $n_2$, $k_1$, and $k_2$ are introduced, and the relation between 33-point DFT and 65-point DFT may be represented as Equations 9 and 10 below.

$$n = \langle 22n_1 + 12n_2 \rangle_{33}$$

$$k = \langle 11k_1 + 3k_2 \rangle_{33} \quad \text{[Equation 9]}$$

$$n = \langle 26n_1 + 40n_2 \rangle_{65}$$

$$k = \langle 13k_1 + 5k_2 \rangle_{65} \quad \text{[Equation 10]}$$

Herein, n indicates an index for an input data, and k indicates an index form a transform coefficient. Equation 9 represents an index mapped to 33-point DFT, and Equation 10 represents an index mapped to 65-point DFT.

The input/output data mapping between 1-dimensional DFT and 2-dimensional DFT of Equations 9 and 10 are given by Equations 11 and 12, respectively. From Equations 9 and 10, according to the present disclosure, new input/output variables may be defined as represented in Equations 11 and 12 with two index arguments) $\hat{x}(n_1,n_2)$ and $\hat{X}(k_1,n_2)$.

$$\hat{x}(n_1,n_2) = x(\langle 22n_1 + 12n_2 \rangle_{33})$$

$$\hat{X}(k_1,k_2) = X(\langle 11k_1 + 3k_2 \rangle_{33}) \quad \text{[Equation 11]}$$

$$\hat{x}(n_1,n_2) = x(\langle 26n_1 + 40n_2 \rangle_{65})$$

$$\hat{X}(k_1,k_2) = X(\langle 13k_1 + 5k_2 \rangle_{65}) \quad \text{[Equation 12]}$$

In Equations 11 and 12, x and X are identical in the representation in Equations 7 and 8 above. Equation 11 is mapped to 33-point DFT, and Equation 12 is mapped to 65-point DFT. From Equations 11 and 12, according to the present disclosure, 2-dimensional DFT equivalent to original 1-dimensional DFT may be derived as represented in Equations 13 and 14 below.

$$\hat{X}(k_1, k_2) = \quad \text{[Equation 13]}$$

$$\sum_{n_2=0}^{10}\sum_{n_1=0}^{2} \hat{x}(n_1, n_2) W_3^{n_1 k_1} W_{11}^{n_2 k_2} = \sum_{n_2=0}^{10} \hat{y}(k_1, n_2) W_{11}^{n_2 k_2}$$

$$\hat{X}(k_1, k_2) = \quad \text{[Equation 14]}$$

$$\sum_{n_2=0}^{12}\sum_{n_1=0}^{4} \hat{x}(n_1, n_2) W_5^{n_1 k_1} W_{13}^{n_2 k_2} = \sum_{n_2=0}^{12} \hat{y}(k_1, n_2) W_{13}^{n_2 k_2}$$

Equation 13 is identical to 1-dimensional 33-point DFT, and Equation 14 is identical to 1-dimensional 65-point DFT. In the case that N is factored in two relatively prime numbers, that is, $N=N_1 N_2$ (an appropriate multi-dimensional indexing is required as represented in Equations 9 and 10), an equivalent relation between 1-dimensional DFT and 2-dimensional DFT may be established.

As such, a design of 16×16 DST7 embracing 33-point DFT with an equivalent 2-dimensional DFT is exemplified in FIG. 16.

Referring to FIG. 16, 16×16 DST7 to which the present disclosure is applied includes an input substitution element 1610, eleven 3-point Winograd FFTs 1620, a first 1FFT stage output substitution element 1630, three 1-point Winograd FFTs 1640 and a final output substitution element 1650.

The input substitution element 1610, the first 1FFT stage output substitution element 1630 and the final output substitution element 1650 incorporate P, Q and R matrixes in Equation 5 or 6 with 2-dimensional indexing of Equations 9 and 10.

Of course, inverse 16×16 DST7 has the same structure of FIG. 16. However, since P, Q and R matrixes in Equation 5 and 6 are different, a part of substitution blocks of the inverse 16×16 DST7 is different from substitution blocks of the forward 16×16 DST7.

FIG. 17 illustrates a block diagram of 32×32 DST7 designed in thirteen 5-point Winograd FFTs and five 13-point Winograd FFTs as an embodiment to which the present disclosure is applied.

Referring to FIG. 17, 32×32 DST7 to which the present disclosure is applied includes an input substitution element 1710, thirteen 5-point Winograd FFTs 1720, a first 1FFT stage output substitution element 1730, five 13-point Winograd FFTs 1740 and a final output substitution element 1750.

In FIG. 16 above, 3-point Winograd FFT and 11-point Winograd FFT are adopted to reduce the number of required multiplications. In the similar way, in FIG. 17, 32×32 DST7 is designed by using 5-point Winograd FFT and 13-point Winograd FFT to reduce the number of required multiplications.

In the present disclosure, the effect is identified through code implementation of 3-point Winograd FFT, 5-point Winograd FFT, 11-point Winograd FFT and 13-point Winograd FFT. However, not all the examples of the corresponding code implementations are described for the convenience of description, but all the corresponding examples are described in the priority document of the present application.

In an example of the code implementation, the entire implementation of Winograd FFT considering both of real part and imaginary part of input and output is represented together with floating-point multiplication coefficients. The real part and imaginary part of N-point Winograd FFT inputs are represented as IR(1:N) and (1:N), respectively, and the real part and imaginary part of N-point Winograd FFT outputs are represented as OR(1:N) and OI(1:N), respectively. Each element may be denoted as IR(i), OI(j), and the like in vectors.

FIGS. 18 and 19 illustrate embodiments to which the present disclosure is applied. FIG. 18 illustrates a simplified implementation block diagram of 16×16 DST, and FIG. 19 illustrates a simplified implementation block diagram of 32×32 DST.

Embodiment 3: Optimization for Low-Complexity DST7 Design

According to Equations 13 and 14 above, for given $n_2$, according to the present disclosure, 3-point DFT of $\hat{x}(0,n_2)$, $\hat{x}(1,n_2)$, and $\hat{x}(2,n_2)$ and 5-point DFT of $\hat{x}(0,n_2)$, $\hat{x}(1,n_2)$, $\hat{x}(2,n_2)$, $\hat{x}(3,n_2)$, and $\hat{x}(4,n_2)$ are performed.

With respect to the generated $\hat{y}(k_1,n_2)$ after an internal DFT loop of Equations 13 and 14 is performed, according to the present disclosure, real part and imaginary part of $(k_1,n_2)$ may be defined as represented in Equation 15 below.

$$\hat{y}(k_1,n_2)=\hat{y}_R(k_1,n_2)+j\cdot\hat{y}_I(k_1,n_2) \quad \text{[Equation 15]}$$

Herein, $\hat{y}_R$ indicates real part and $\hat{y}_I$ indicates imaginary part.

Similarly, input $\hat{x}(n_1,n_2)$ and output $\hat{X}(k_1,k_2)$ may also be divided into real part and imaginary part, respectively.

$$\hat{x}(n_1,n_2)=\hat{x}_R(n_1,n_2)+j\cdot\hat{x}_I(n_1,n_2)$$

$$\hat{X}(k_1,k_2)=\hat{X}_R(k_1,k_2)+j\cdot\hat{X}_I(k_1,k_2) \quad \text{[Equation 16]}$$

Herein, the input $\hat{x}(n_1,n_2)$ may be pixels or residual data expected to which a designated transform is applied. Accordingly, it may be assumed that actual $\hat{x}_I(n_1,n_2)$ has zero value for all case.

Under the assumption, according to the present disclosure, the relations between first transformed data) $\hat{y}(k_1,n_2)$ output by input symmetries imposed to a first stage DFT (i.e., 3-point DFT in the case of 33-point DFT, 5-point DFT in the case of 65-point DFT). Such symmetries are provided by P and Q matrixes of Equation 5 or 6, and these are described in Equations 17 and 18 below.

Case 1)

$$x(0,n_2)=0, x(2,n_2)=-x(1,n_2)$$

Case 2)

$$x(0,n_2)=-x(0,n_2'), x(1,n_2)=-x(2,n_2'), x(2,n_2)=-x(1,n_2')$$
for some $n_2'$ [Equation 17]

Case 1)

$$x(0,n_2)=0, x(3,n_2)=-x(2,n_2), x(4,n_2)=-x(1,n_2)$$

Case 2)

$$x(0,n_2)=-x(0,n_2'), x(1,n_2)=-x(4,n_2'), x(2,n_2)=-x(3,n_2'),$$

$$x(3,n_2)=-x(2,n_2'), x(4,n_2)=-x(1,n_2') \text{ for some } n_2' \quad \text{[Equation 18]}$$

Furthermore, in $\hat{y}(k_1,n_2)$, the first stage output relations are as represented in Equations 19 and 20 below.

$$\hat{y}_R(2,n_2)=\hat{y}_R(1,n_2)$$

$$\hat{y}_I(0,n_2)=0, \hat{y}_I(2,n_2)=-\hat{y}_I(1,n_2) \quad \text{[Equation 19]}$$

$$\hat{y}_R(3,n_2)=\hat{y}_R(2,n_2), \hat{y}_R(4,n_2)=\hat{y}_I(1,n_2)$$

$$\hat{y}_I(0,n_2)=0, \hat{y}_I(3,n_2)=-\hat{y}_I(2,n_2), \hat{y}_I(4,n_2)=-\hat{y}_I(1,n_2) \quad \text{[Equation 20]}$$

Equations 17 and 19 above represent relations in 3-point FFT belonged to 33-point DFT, and Equations 18 and 20 above represent relations in 5-point FFT belonged to 65-point DFT.

For example, in Equations 17 and 18, Case 1 occurs when $n_2=0$, and Case 2 occurs when $n_2=11-n_2'$, $n_2'=1, 2, \ldots, 10$ ($n_2=13-n_2'$, $n_2'=1, 2, \ldots, 12$). With respect to Case 1 inputs, real parts of all outputs from 3-point FFT (5-point FFT) become zero, and since remaining one output according to Equations 19 and 20 (two outputs) may be reconstructed according to the present disclosure, it is required to maintain one (two) imaginary part output(s).

In Equations 17 and 18, owing to the input patterns of Case 2, according to the present disclosure, there is a relation between $\hat{y}(k_1,n_2)$ and $\hat{y}(k_1,n_2')$ as represented in Equation 21 below.

$$\hat{y}_R(k_1,n_2)=\hat{y}_R(k_1,n_2')$$

$$\hat{y}_I(k_1,n_2)=\hat{y}_I(k_1,n_2') \quad \text{[Equation 21]}$$

In the case of Equation 21 above, the relation between indices $n_2=11-n_2'$, $n_2=1, 2, \ldots, 10$ ($n_2=13-n_2'$, $n_2'=1, 2, \ldots, 12$) of 11-point FFT (13-point FFT) is applied in the same way.

Therefore, according to the present disclosure, using Equation 21 above, 3-point FFT (5-point FFT) may be performed only in the case that $n_2$ is in the range of [0, 5] ([0, 6]), and accordingly, the associated calculation amount may be reduced.

Furthermore, in each 3-point FFT (5-point FFT) calculations throughout the range of [1, 5] ([1, 6]), since the other parts may be recovered according to Equation 21 above, only a part of outputs, which is two (three) real part outputs and one (two) imaginary part(s), are calculated.

Owing to the symmetry existed in the first stage outputs (Equation 21 above), outputs calculated from an external loop (second stage FFT) in Equations 13 and 14 are symmetrically arranged, and this may reduce calculation amount. The input pattern of the external loop (second stage FFT) is as represented in Equations 22 to 25 below.

1) Real Part $$\hat{y}_R(k_1,0)=0, \hat{y}_R(k_1,6)=-\hat{y}_R(k_1,5), \hat{y}_R(k_1,7)=-\hat{y}_R(k_1,4),$$

$$\hat{y}_R(k_1,8)=-\hat{y}_R(k_1,3), \hat{y}_R(k_1,9)=-\hat{y}_R(k_1,2), \hat{y}_R(k_1,10)=-\hat{y}_R(k_1,1) \quad \text{[Equation 22]}$$

1) Real Part $$\hat{y}_R(k_1,0)=0, \hat{y}_R(k_1,7)=-\hat{y}_R(k_1,6), \hat{y}_R(k_1,8)=-\hat{y}_R(k_1,5), \hat{y}_R(k_1,9)=-\hat{y}_R(k_1,4),$$

$$\hat{y}_R(k_1,10)=-\hat{y}_R(k_1,3), \hat{y}_R(k_1,11)=-\hat{y}_R(k_1,2), \hat{y}_R(k_1,12)=-\hat{y}_R(k_1,1) \quad \text{[Equation 23]}$$

2) Imaginary Part $$\hat{y}_I(k_1,6)=\hat{y}_I(k_1,5), \hat{y}_I(k_1,7)=\hat{y}_I(k_1,4),$$

$$\hat{y}_I(k_1,8)=\hat{y}_I(k_1,3), \hat{y}_I(k_1,9)=\hat{y}_I(k_1,2), \hat{y}_I(k_1,10)=\hat{y}_I(k_1,1) \quad \text{[Equation 24]}$$

2) Imaginary Part $$\hat{y}_I(k_1,7)=\hat{y}_I(k_1,6), \hat{y}_I(k_1,8)=\hat{y}_I(k_1,5), \hat{y}_I(k_1,9)=\hat{y}_I(k_1,4),$$

$$\hat{y}_I(k_1,10)=\hat{y}_I(k_1,3), \hat{y}_I(k_1,11)=\hat{y}_I(k_1,2), \hat{y}_I(k_1,12)=\hat{y}_I(k_1,1) \quad \text{[Equation 25]}$$

Equations 22 and 24 represent input symmetries encountered in 11-point FFT belonged to 33-point FFT.

Equations 23 and 25 represent input symmetries encountered in 13-point FFT belonged to 65-point FFT. Due to external loop iteration, other symmetry also occurs among the input sets of 11-point FFT (13-point FFT), and this enables an output recovery for an iteration from one of the previous iterations.

In the present disclosure, a vector of $\hat{y}(k_1,n_2)$ is represented as $\hat{Y}(k_1)=[\hat{y}(k_1,0)\ \hat{y}(k_1,1) \ldots (k_1,N_2-1)]^T = \hat{Y}_R(k_1) + j \cdot \hat{Y}_I(k_1)$ input symmetries existed in the iteration process may be represented as Equation 26 below.

Case 1: $\hat{Y}_I(k_1)=0$

Case 2: $\hat{Y}_R(k_1)=\hat{Y}_R(k_1'), \hat{Y}_I(k_1)=-\hat{Y}_I(k_1')$ [Equation 26]

In the 2-dimensional DFT like 33-point FFT (65-point FFT), $k_1$ has the range of [0, 2] ([0, 4]).

In Equation 26 above, Case 1 occurs only when $k_1=0$. In Equation 26 above, Case 2 occurs only when $k_1=3-k_1'$, $k_1'=1, 2$ ($k_1=5-k_1'$, $k_1'=1, 2, 3, 4$).

From the symmetry of Equation 26, since an output of skipped iteration may be derived from one of the previous iterations, a valid iteration number of 11-point FFT (15-point FFT) in 33-point FFT (65-point FFT) may be reduced from 3 (5) to 2 (3).

Furthermore, according to Equations 5 and 6 above, according to the present disclosure, among outputs from 33-point FFT (65-point FFT), only imaginary parts may be taken, and accordingly, an output pattern of each Case in Equation 26 may be represented as Equations 27 to 30 below.

Case 1:

$$\hat{X}_I(k_1,0)=0, \hat{X}_I(k_1,11-k_2)=-\hat{X}_I(k_1,k_2), k_2=1,2,\ldots,10 \quad \text{[Equation 27]}$$

Case 1:

$$\hat{X}_I(k_1,0)=0, \hat{X}_I(k_1,13-k_2)=-\hat{X}_I(k_1,k_2), k_2=1,2,\ldots,12 \quad \text{[Equation 28]}$$

Case 2:

$$\hat{X}_I(k_1,0)=-\hat{X}_I(3-k_1,0), \hat{X}_I(k_1,k_2)=-\hat{X}_I(3-k_1,11-k_2), k_1=1,2, k_2=1,2,\ldots,10 \quad \text{[Equation 29]}$$

Case 2:

$$\hat{X}_I(k_1,0)=-\hat{X}_I(5-k_1,0), \hat{X}_I(k_1,k_2)=-\hat{X}_I(5-k_1,13-k_2), k_1=1,2,3,4, k_2=1,2,\ldots,12 \quad \text{[Equation 30]}$$

Equations 27 and 29 above represent output symmetry in 11-point FFT belonged to 33-point FFT, and Equations 28 and 30 above represent output symmetry in 13-point FFT belonged to 65-point FFT.

Due to the symmetries of Equations 27 to 30, the thereafter iterations of external loop in 2-dimensional DFT are not required. From the relation between forward DST7 and DFT in Equation 5 above, k indices of final output are $k=2m+1$. Here, a range of m is [0, 15] ([0, 31]) with respect to 16×16 DST7 (32×32 DST7).

Similarly, according to Equation 6 above, as inverse DST7, k indices for DST6 are $k=m+1$. Here, a range of m is [0, 15] ([0, 31]) with respect to 16×16 DST6 (32×32 DST6). The k indices are uniquely mapped to $k_1$ and $k_2$ from Equations 9 and 10 above. Outputs of 33-point FFT or 65-point FFT are appropriately output, and their signs are set in accordance with Equations 5 or 6.

Consequently, the number of outputs inevitably calculated by considering all symmetries is 16 (=the number of outputs from the first iteration+the number of outputs from the second iteration=5+11) and 32 (=the number of outputs from the first iteration+the number of outputs from the second iteration+the number of outputs from the third iteration=6+13+13) in 33-point DFT and 65-point DFT, respectively.

By considering all symmetries described in the previous Equations and the use of imaginary part outputs from DFT only, unnecessary codes and variables are removed, and accordingly, Winograd FFT implementation may be simplified.

According to the present disclosure, the number of iterations may be minimized, and only essential code fragments are remained, each of iterations may be customized. Through the code implementation of 11-point FFT in which only codes related to imaginary part outputs are remained, according to the present disclosure, code of similar type may be decreased.

When the code implementation and symmetries described in the previous Equations are applied, 33-point FFT and 65-point FFT may be simplified as shown in FIGS. 16 and 17 and FIGS. 18 and 19, respectively.

In FIG. 18 (FIG. 19), simplified 3-point Winograd FFT Type 1 (simplified 5-point Winograd FFT Type 1) may use the input relation in Case 1 of Equations 17 and 18 above, and simplified 3-point Winograd FFT Type 2 (simplified 5-point Winograd FFT Type 2) may use the input relation in Case 2 of Equations 17 and 18 above.

Similarly, simplified 11-point Winograd FFT Type 1 (simplified 13-point Winograd FFT Type 1) may use the input relation in Case 1 of Equations 22 to 25 above, and simplified 11-point Winograd FFT Type 2 (simplified 13-point Winograd FFT Type 2) may use the input relation in Case 2 of Equations 22 to 25 above.

In addition, not all input/output shown in FIG. 18 and FIG. 19 are complex numbers, but real numbers corresponding to a real part or an imaginary part, respectively.

FIG. 20 illustrates integer coefficients used for multiplication operation of Winograd FFTs as an embodiment to which the present disclosure is applied.

According to Equations 5 and 6 above, 8×8 DST7 has 17-point DFT therein. A length of a pseudo code in 17-point Winograd FFT may be significantly longer than others. However, as described above, when a code optimization is applied, only real part inputs are input to the pseudo code, and only imaginary parts are remained, and accordingly, the pseudo code may be significantly simplified.

For normalization, in each code implementation example, a few parts of multiplication coefficients need to be scaled by $1/\sqrt{2N+1}$. In addition, in most cases, only integer multiplications are permitted, such coefficients need to be properly scaled and rounded while maintaining enough degree of accuracy.

According to Equations for deriving integer coefficients and shift-based scale factors (S), FIG. 20 shows all integer coefficients shown in the code implementation examples in which the present disclosure is applied.

In FIG. 20, since 13-length FFT and 17-length FFT are used in 32×32 and 8×8 DST7, additional scaling by $2^{1/2}$ is to 13-length FFT and 17-length FFT.

Specifically, both of $\log_2 32$ and $\log_2 28$ are odd number integers, and $2^{1/2}$ scaling in reference software is applied thereto. In FIG. 20, by the fact that addition of two identical inputs caused by symmetric input pattern is changed to scaling of 2, additional scaling of 2 is shown in 17-length FFT, and the scaling derives an integer coefficient.

When an equation identical to other scaling factor S is applied in FIG. 20, different set of integer coefficients having different degree of accuracies may be obtained.

FIG. 21 illustrates the number of operations required for converting a single row or column of length N as an embodiment to which the present disclosure is applied.

The memory requirement for Winograd FFTs is caused by storing multiplication coefficients. The memory use according to the embodiment of the present disclosure is very smaller than the case of direct matrix multiplication.

Furthermore, in FFT modules of the same length, each coefficient set may be shared. For example, in FIG. 17 or FIG. 19, only one coefficient set may be stored for all 5-point Winograd FFTs. That is, a single coefficient set for 5-point Winograd FFT and a single coefficient set for 13-point Winograd FFT are enough for 32×32 DST7 implementation.

Table 1 below represents the number of coefficients for all types of Winograd FFTs used in the present disclosure to implement low-complexity 8×8, 16×16 and 32×32 DST7.

TABLE 1

| FFT length | # of coefficients |
| --- | --- |
| 3 | 2 |
| 5 | 5 |
| 11 | 21 |
| 13 | 21 |
| 17 | 21 |
| Total | 70 |

Embodiment 4: Method for Designing Low-Complexity DST7

The present disclosure is to propose a method for indexing 2-dimensional DFT used in designing DST7 and a method for substituting Winograd FFT (Fast Fourier Transform) blocks with simplified DFT blocks by utilizing symmetry of input/output data and intermediate result values.

1) An embodiment provides, when DST7 is implemented with 2-dimensional DFT, a method for general mapping between an index for equivalent 1-dimensional DFT and an index for 2-dimensional DFT.

2) An embodiment provides a method for substituting Winograd FFT blocks with simplified DFT blocks by utilizing symmetry between input/output data and intermediate result values.

3) An embodiment provides a method for substituting Winograd FFT blocks with FFT implemented with different algorithms for each block.

According to the present disclosure, when a still image or a video image is encoded, a method for more general mapping between an index in 2-dimensional DFT used in DST7 and an index in equivalent 1-dimensional DFT is proposed, and various designing methods may be accommodated.

In addition, Winograd FFT blocks that may include several intermediate calculation steps are substituted by simpler DFT block, and complexity in implementation may be reduced and parallel performance may be increased.

Hereinafter, various embodiments for implementing DST7 which may be applied as one of primary transforms with low-complexity are described.

Embodiment 4-1: Indexing Method for 2-Dimensional DFT Configuring DST7

2-dimensional DFT becomes available by Equations 9 and 11 above, but the present disclosure is not limited thereto. That is, in the case that Equation 31 below is satisfied, 2-dimensional DFT as represented in Equations 13 and 14 above may be established.

$N = N_1 N_2$ $n = \langle K_1 n_1 + K_2 n_2 \rangle_N$ $$k = \langle K_3 k_1 + K_4 k_2 \rangle_N$$

$$\langle K_1 K_3 \rangle_N = N_2$$

$$\langle K_2 K_4 \rangle_N = N_1$$

$$\langle K_1 K_4 \rangle_N = \langle K_2 K_3 \rangle_N = 0 \qquad \text{[Equation 31]}$$

Herein, $N_1$ and $N_2$ indicate mutually prime factors. In addition, $\langle x \rangle_N = x \bmod N$.

33-point 1-dimensional DFT corresponds to $(N_1, N_2) = \langle 3, 11 \rangle$, and 65-point 1-dimensional DFT corresponds to $(N_1, N_2) = \langle 5, 13 \rangle$. In both cases, since $N_1$ and $N_2$ are mutually prime factors, both cases may apply Equation 31 above. In the case that $K_1$, $K_2$, $K_3$ and $K_4$ satisfy Equation 32 below, in Equation 31 above, condition $\langle K_1 K_4 \rangle_N = \langle K_2 K_3 \rangle_N = 0$ is satisfied.

$$K_1 = \alpha N_2, K_2 = \beta N_1, K_3 = \gamma N_2, K_4 = \delta N_1 \qquad \text{[Equation 32]}$$

Furthermore, in order to satisfy other conditions in Equation 31, the relation in Equation 33 below needs to be satisfied.

$$\langle \alpha \gamma N_2 \rangle_{N_1} = 1, \langle \beta \delta N_1 \rangle_{N_2} = 1 \qquad \text{[Equation 33]}$$

Accordingly, all $\alpha$, $\beta$, $\gamma$, $\delta$ satisfying Equation 33 above may derive $K_1$, $K_2$, $K_3$ and $K_4$ satisfying Equation 31 above from Equation 32, and equivalent 2-dimensional DFT may be configured. Available embodiments of $\alpha$, $\beta$, $\gamma$, $\delta$ are as below for example.

1) $(\alpha, \beta, \gamma, \delta) = \langle 2, 4, 1, 1 \rangle$
This corresponds to Equation 9 above, and is the case that $(N_1, N_2) = \langle 3, 11 \rangle$.

2) $(\alpha, \beta, \gamma, \delta) = \langle 2, 8, 1, 1 \rangle$
This corresponds to Equation 10 above, and is the case that $(N_1, N_2) = \langle 5, 13 \rangle$.

3) $(\alpha, \beta, \gamma, \delta) = \langle 1, 1, 2, 4 \rangle$
This is the case that $(N_1, N_2) = \langle 3, 11 \rangle$.

4) $(\alpha, \beta, \gamma, \delta) = \langle 1, 1, 2, 8 \rangle$
This is the case that $(N_1, N_2) = \langle 5, 13 \rangle$.

When the corresponding 2-dimensional DFT is constructed by $K_1$, $K_2$, $K_3$ and $K_4$ derived from $\alpha$, $\beta$, $\gamma$, $\delta$ satisfying Equation 33 above, in the process of calculating the 2-dimensional DFT, a symmetry may occur for input/output data and an intermediate value such as in Equations 17, 18, 19, 20, 21, 22, 23, 24, 25, 26, 27 and 28 above.

Therefore, even in the case of 2-dimensional DFT having different index from embodiments 1 to 3 described above (i.e., having different $\alpha$, $\beta$, $\gamma$, $\delta$ values), the method and structure proposed in embodiments 1 to 3 described above or a method to be proposed in embodiment 3 is applied, and consequently, complexity required for performing DST7 may be significantly reduced.

Embodiment 4-2: Configuration of Substituting Wingrad FFT Block with Simplified DFT Block In embodiments 1 to 3 above, Winograd FFT is used for reducing complexity, but the present embodiment proposes a configuration of using general DFT instead of Winograd FFT.

A mathematical expression for general 1-dimensional DFT is given by Equations 7 and 8 for 33-point DFT and 65-point DFT, respectively. In addition, a mathematical expression for general 2-dimensional DFT is given by Equations 13 and 14 for 33-point 1-dimensional DFT and 65-point 1-dimensional DFT, respectively.

Even in the case that not all DFTs are implemented in Winograd FFT as in FIGS. 16 to 19 above, the symmetry in Equations 19 to 28 above is satisfied without any change. Accordingly, even in the case of using general DFT, calculation amount may be significantly reduced by utilizing the symmetry.

The first stage DFT in FIG. 16 to FIG. 19 above is 3-point DFT or 5-point DFT (Winograd FFT is applied in the corresponding drawings). General DFT equation for the first stage DFT is as below.

$$\hat{y}(k_1, n_2) = \qquad \text{[Equation 34]}$$

$$\hat{y}_R(k_1, n_2) + j \cdot \hat{y}_I(k_1, n_2) = \sum_{n_1=0}^{N_1-1} \hat{x}(n_1, n_2) W_{N_1}^{n_1 k_1}$$

$$\hat{y}_R(k_1, n_2) = \sum_{n_1=0}^{N_1-1} \hat{x}(n_1, n_2) \cos\left(\frac{2\pi k_1 n_1}{N_1}\right)$$

$$\hat{y}_I(k_1, n_2) = -\sum_{n_1=0}^{N_1-1} \hat{x}(n_1, n_2) \sin\left(\frac{2\pi k_1 n_1}{N_1}\right)$$

In Equation 34, when $N_1=3$, it becomes 3-point DFT, and when $N_1=5$, it becomes 5-point DFT. By the symmetry presented in Equation 21 above, the corresponding DFT may be calculated only in the range $0 \sim (N_2-1)/2$ of $n_2$ in Equation 34 above. That is, when $N_1=3$, $N_2=11$, and when $N_1=5$, $N_2=13$.

Case 1 of Equations 17 and 18 above correspond to simplified 3-point Winograd FFT Type 1 of FIG. 18 and simplified 5-point Winograd FFT Type 1 of FIG. 9, respectively, and this corresponds to the case that $n_2=0$.

When simplified 3-point Winograd FFT Type 1 is substituted by simplified 3-point DFT Type 1, simplified 3-point DFT Type 1 is given by Equation 35 below. This may be obtained by substituting Case 1 relation of Equation 17 above to Equation 34 above.

$$\hat{y}_R(k_1, 0) = 0, \hat{y}_I(k_1, 0) = -2\hat{x}(1, 0)\sin\left(\frac{2\pi k_1}{3}\right) \qquad \text{[Equation 35]}$$

Since calculation is required only for the case that $k_1=1$ in Equation 35 above (due to the symmetry in Equation 19 above), only one time of multiplication is required. A mathematical expression for simplified 5-point DFT Type 1 is obtained as Equation 36 below in the same method.

$$\hat{y}_R(k_1, 0) = 0, \qquad \text{[Equation 36]}$$

$$\hat{y}_I(k_1, 0) = -2\hat{x}(1, 0)\sin\left(\frac{2\pi k_1}{5}\right) - 2\hat{x}(2, 0)\sin\left(\frac{2\pi k_1 \cdot 2}{5}\right)$$

Since calculation is required only for the case that $k_1=1$, 2 in Equation 36 above (due to the symmetry in Equation 20 above), only two times of multiplications are required. The multiplication of 2 shown in Equations 35 and 36 may be processed by a left shift operation and is not counted as multiplication.

Case 2 of Equations 17 and 18 above correspond to simplified 3-point Winograd FFT Type 2 of FIG. 18 and simplified 5-point Winograd FFT Type 2 of FIG. 19, respectively, and this corresponds to the cases that $n_2=1\sim5$ and $n_2=1\sim6$, respectively.

When simplified 3-point Winograd FFT Type 2 is substituted by simplified 3-point DFT Type 2, simplified 3-point DFT Type 2 may be implemented by Equation 34 above. Herein, when the symmetry of Equation 19 above is utilized, $\hat{y}_R(k_1,n_2)$ may be obtained only in the case that $k_1$=0, 1, and $\hat{y}_I(k_1,n_2)$ may be obtained only in the case that $k_1$=1.

Similarly, the case of substituting simplified 5-point Winograd FFT Type 2 with simplified 5-point DFT Type 2 may also be implemented by Equation 34 above. Likewise, when the symmetry of Equation 20 above is utilized, $\hat{y}_R(k_1, n_2)$ may be obtained only in the case that $k_1$=0, 1, 2, and $\hat{y}_I(k_1,n_2)$ may be obtained only in the case that $k_1$=1, 2.

In FIGS. 16 to 19, the second stage DFT is 11-point DFT or 13-point DFT (it is implemented in Winograd FFT in the drawings). General DFT equation for the second stage DFT is as represented in Equation 37 below.

$$\hat{X}(k_1, k_2) = $$
[Equation 37]
$$\hat{X}_R(k_1, k_2) + j \cdot \hat{X}_I(k_1, k_2) = \sum_{n_2=0}^{N_2-1} \hat{y}(k_1, n_2) W_{N_2}^{n_2 k_2}$$

$$\hat{X}_I(k_1, k_2) = $$
$$\sum_{n_2=0}^{N_2-1} \left[ \hat{y}_I(k_1, n_2)\cos\left(\frac{2\pi k_2 n_2}{N_2}\right) - \hat{y}_R(k_1, n_2)\sin\left(\frac{2\pi k_2 n_2}{N_2}\right) \right]$$

In Equation 37 above, when $N_2$=11, it becomes 11-point DFT, and when $N_2$=13, it becomes 13-point DFT. By the symmetry presented in Equations 26 to 30 above, the corresponding DFT may be calculated only in the range 0~$(N_1-1)/2$ of $k_1$ in Equation 37 above. When $N_2$=11, $N_1$=3, and when $N_2$=13, $N_1$=5.

Case 1 of Equation 26 and Equation 27 above correspond to simplified 11-point Winograd FFT Type 1 of FIG. 18. In addition, Case 1 of Equation 26 and Equation 28 above correspond to simplified 13-point Winograd FFT Type 1 of FIG. 19.

By using the symmetry presented in Equations 22 to 25 above, simplified 11-point DFT Type 1 (substituting simplified 11-point Winograd FFT Type 1) and simplified 13-point DFT Type 1 (substituting 13-point Winograd FFT Type 1) are given by Equation 38 below. That is, this corresponds to the case that $k_1$=0.

$$\hat{X}_I(0, k_2) = \sum_{n_2=1}^{\frac{N_2-1}{2}} [-2\hat{y}_R(0, n_2)]\sin\left(\frac{2\pi k_2 n_2}{N_2}\right) =$$
[Equation 38]
$$-2\sum_{n_2=1}^{\frac{N_2-1}{2}} \hat{y}_R(0, n_2)\sin\left(\frac{2\pi k_2 n_2}{N_2}\right)$$

According to Equation 38 above, the case of simplified 11-point DFT Type 1 requires 5 times of multiplications, and the case of simplified 13-point DFT Type 1 requires 6 times of multiplications.

Similarly, by using the symmetry presented in Equations 22 to 25 above, simplified 11-point DFT Type 2 (substituting simplified 11-point Winograd FFT Type 2) and simplified 13-point DFT Type 2 (substituting 13-point Winograd FFT Type 2) may be obtained by Equation 39 below. Here, simplified 11-point DFT Type 2 is performed when $k_1$=1, and 13-point DFT Type 2 is performed when $k_1$=1, 2.

$$\hat{X}_I(k_1, k_2) = 2\left[\sum_{n_2=1}^{\frac{N_2-1}{2}} \hat{y}_I(k_1, n_2)\cos\left(\frac{2\pi k_2 n_2}{N_2}\right)\right] +$$
[Equation 39]
$$\hat{y}_I(k_1, 0) - 2\left[\sum_{n_2=1}^{\frac{N_2-1}{2}} \hat{y}_R(k_1, n_2)\sin\left(\frac{2\pi k_2 n_2}{N_2}\right)\right]$$

According to Equation 39 above, the case of simplified 11-point DFT Type 2 requires 10 times of multiplications, and the case of simplified 13-point DFT Type 2 requires 12 times of multiplications.

In the multiplications shown in Equations 35 to 39, cosine values and sine values are multiplied as DFT kernel coefficients. Since available $N_1$ and $N_2$ values are 3, 5, 11 and 13, coefficient values as represented in Equation 40 below are shown in the corresponding multiplications. However, the case that i=0 is excluded since the corresponding cosine or sine value has 0 or 1.

$$\cos\left(\frac{2\pi i}{3}\right), \sin\left(\frac{2\pi i}{3}\right), i = 1, 2$$
[Equation 40]
$$\cos\left(\frac{2\pi i}{5}\right), \sin\left(\frac{2\pi i}{5}\right), i = 1, 2, 3, 4$$
$$\cos\left(\frac{2\pi i}{11}\right), \sin\left(\frac{2\pi i}{11}\right), i = 1, 2, 3, 4, 5$$
$$\cos\left(\frac{2\pi i}{13}\right), \sin\left(\frac{2\pi i}{13}\right), i = 1, 2, 3, 4, 5, 6$$

In Equations 38 and 39 above, since $n_2$ index increases only up to $(N_2-1)/2$, for the last two cases of Equation 40, i value is limited up to $(N_2-1)/2$.

The number of all coefficients shown in Equation 40 becomes $2\times(2+4+5+6)=34$, and $2\times(2+5)=14$ for 33-point DFT and $2\times(4+6)=20$ for 65-point DFT. Each coefficient may be approximated to an integer form through scaling and rounding. Since input data of DST7 is residual data of an integer form, all associated calculations may be performed by integer operation. Of course, since intermediate values are also scaled values, it is required to apply down scaling properly in each calculation step or output step.

Furthermore, since the form in which cosine value or sine value is referred is $$\cos\left(\frac{2\pi k_1 n_1}{N_1}\right), \sin\left(\frac{2\pi k_1 n_1}{N_1}\right), \cos\left(\frac{2\pi k_2 n_2}{N_2}\right), \sin\left(\frac{2\pi k_2 n_2}{N_2}\right),$$

reference order of coefficient values may be changed depending on $k_1$ and $k_2$ values.

Therefore, an order table having $k_1$ and $k_2$ values as address is made, and a reference order depending on $n_1$ and $n_2$ may be obtained in table look-up format. For example, when $N_2$=11, $k_2$=3, $\langle k_2 n_2 \rangle_{N_2}|_{n_2=1, 2, \ldots, 5}$=[3, 6, 9, 1, 4] may be a corresponding table entry, and a corresponding table entry may be configured for all available $k_2$ values.

Embodiment 4-3: Configuration of Substituting Each Block of Wingrad FFT by FFT of Different Algorithm Winograd FFT block shown in FIGS. 16 and 17 may be substituted by different FFT algorithms. In embodiment 4, Cooly-Tukey FFT algorithm is proposed.

Accordingly, while maintaining the structure of FIGS. 16 and 17 (2-dimensional FFT), different FFT algorithm except Winograd FFT may be applied for each block (3-point FFT, 5-point FFT, 11-point FFT, 13-point FFT, 17-point FFT).

Furthermore, different FFT algorithm may be applied for each FFT block shown in FIGS. 16 and 17. For example, the general DFT based algorithm proposed in embodiment 4-2 may be applied to 3-point DFT and 5-point DFT, and Winograd FFT may be applied to 11-point FFT. In addition, Radar FFT algorithm may be applied to 13-point DFT.

Similarly, when different FFT algorithm is applied, the symmetry for input/output data and intermediate result values are utilized as shown in FIGS. 18 and 19, more simplified FFT may be applied for each block.

FIG. 22 illustrates a content streaming system to which the disclosure is applied.

Referring to FIG. 22, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blu-ray player, Internet access TV, a home theater system, a smartphone, a tablet PC, and a digital video recorder (DVR.

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include a Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for reconstructing a video signal based on low-complexity DST7 design, comprising:
   obtaining a transform index of a current block from the video signal, wherein the transform index corresponds to any one of a plurality of transform combinations including a combination of DST7 and/or DCT8;
   deriving a transform combination corresponding to the transform index, wherein the transform combination includes a horizontal transform and a vertical transform, and wherein the horizontal transform and the vertical transform correspond to at least one of the DST7 or the DCT8;
   performing an inverse transform in a vertical direction with respect to the current block based on the DST7;
   performing an inverse transform in a horizontal direction with respect to the current block based on the DCT8; and reconstructing the video signal based on the current block which the inverse transform is performed, wherein the DST7 includes Discrete Fourier Transform (DFT) and has a different type of DFT structure based on a size of the current block, wherein the DST7 includes eleven 3-point Winograd Fast Fourier Transforms (FFTs) and three 11-point Winograd FFTs based on the size of the current block being 16×16, and wherein the DST7 includes thirteen 5-point Winograd FFTs and five 13-point Winograd FFTs based on the size of the current block being 32×32.

2. The method of claim 1, wherein each of output data of the eleven 3-point Winograd FFTs or the thirteen 5-point Winograd FFTs has symmetry.

3. An apparatus for reconstructing a video signal based on low-complexity DST7 design, comprising:

a processor configured to:

obtain a transform index of a current block from the video signal, wherein the transform index corresponds to any one of a plurality of transform combinations including a combination of DST7 and/or DCT8, derive a transform combination corresponding to the transform index, perform an inverse transform in a vertical direction with respect to the current block based on the DST7, and perform an inverse transform in a horizontal direction with respect to the current block based on the DCT8, wherein the transform combination includes a horizontal transform and a vertical transform, and wherein the horizontal transform and the vertical transform correspond to at least one of the DST7 or the DCT8, and reconstruct the video signal based on the current block which the inverse transform is performed, wherein the DST7 includes Discrete Fourier Transform (DFT) and has a different type of DFT structure based on a size of the current block, wherein the DST7 includes eleven 3-point Winograd Fast Fourier Transforms (FFTs) and three 11-point Winograd FFTs based on the size of the current block being 16×16, and wherein the DST7 includes thirteen 5-point Winograd FFTs and five 13-point Winograd FFTs based on the size of the current block being 32×32.

4. The apparatus of claim 3, wherein each of output data of the eleven 3-point Winograd FFTs or the thirteen 5-point Winograd FFTs has symmetry.

5. An apparatus for encoding a video signal based on low-complexity DST7 design, comprising:

a processor configured to:

derive a transform combination applied to a current block, wherein the transform combination includes a horizontal transform and a vertical transform, and wherein the horizontal transform and the vertical transform correspond to at least one of DST7 or DCT8;

perform a transform in a horizontal direction with respect to the current block based on the DCT8;

perform a transform in a vertical direction with respect to the current block based on the DST7; and generate a transform index corresponding to the transform combination, wherein the transform index corresponds to any one of a plurality of transform combinations including a combination of DST7 and/or DCT8, wherein the DST7 includes Discrete Fourier Transform (DFT) and has a different type of DFT structure based on a size of the current block, wherein the DST7 includes eleven 3-point Winograd Fast Fourier Transforms (FFTs) and three 11-point Winograd FFTs based on the size of the current block being 16×16, and wherein the DST7 includes thirteen 5-point Winograd FFTs and five 13-point Winograd FFTs based on the size of the current block being 32×32.

* * * * *